(12) United States Patent
Kamiya et al.

(10) Patent No.: US 12,216,442 B2
(45) Date of Patent: Feb. 4, 2025

(54) PROGRAM CREATION DEVICE, PROGRAM CREATION METHOD, AND PROGRAM

(71) Applicant: KABUSHIKI KAISHA YASKAWA DENKI, Kitakyushu (JP)

(72) Inventors: Yosuke Kamiya, Kitakyushu (JP); Shinichiro Obata, Kitakyushu (JP); Megumi Yasuda, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 395 days.

(21) Appl. No.: 17/557,154

(22) Filed: Dec. 21, 2021

(65) Prior Publication Data

US 2022/0206453 A1 Jun. 30, 2022

(30) Foreign Application Priority Data

Dec. 25, 2020 (JP) ................................ 2020-216235

(51) Int. Cl.
*G05B 19/042* (2006.01)

(52) U.S. Cl.
CPC ..... *G05B 19/0426* (2013.01); *G05B 19/0423* (2013.01); *G05B 2219/23007* (2013.01)

(58) Field of Classification Search
CPC ............ G05B 19/0426; G05B 19/0423; G05B 2219/23007; G06F 9/4482; G06Q 10/06316
See application file for complete search history.

(56) References Cited

U.S. PATENT DOCUMENTS

| 5,841,656 A * | 11/1998 | Taruishi .................. G06F 8/34 700/86 |
| 2005/0278670 A1* | 12/2005 | Brooks ............ G06Q 10/06312 716/111 |
| 2009/0164038 A1* | 6/2009 | Bretschneider .... G05B 19/4063 700/182 |
| 2019/0196442 A1* | 6/2019 | Ezawa ................. G05B 19/406 |

FOREIGN PATENT DOCUMENTS

| JP | 9-73307 A | 3/1997 |
| JP | 2011-238041 A | 11/2011 |
| JP | 6761158 B1 | 9/2020 |

OTHER PUBLICATIONS

Japanese Office Action issued Apr. 26, 2022 in Japanese Patent Application No. 2020-216235 (with unedited computer generated English Translation), 8 pages.
Office Action issued Nov. 30, 2024 in corresponding Chinese Patent Application No. 202111605112.6 (with English-language Translation), 16 pages.

\* cited by examiner

*Primary Examiner* — Kidest Bahta
(74) *Attorney, Agent, or Firm* — Oblon, McClelland, Maier & Neustadt, L.L.P.

(57) ABSTRACT

A creation device includes processing circuitry that acquires process information about multiple processes executed by one or more industrial machines, controls display, based on the process information of the processes, of a specification screen in which at least one of a pre-process and a post-process of each of the processes is specified, and creates a control program of a control device that controls the one or more industrial machines such that the processes are executed in an order specified using the specification screen.

20 Claims, 23 Drawing Sheets

FIG. 8

| Cell name | Industrial machine name | Industrial machine type | Register range | Communication setting | Control program information |
|---|---|---|---|---|---|
| Cell 1 | 20A | Robot controller | 0000~4999 | 192.168.10.1 Profile A ··· | Control program 1 |
| | 20B | Processing device | 5000~12000 | 192.168.10.2 Profile B ··· | |

| Process ID | Process name | Industrial machine name | Order | Execution condition | | Instruction program information | Process program information | Variable information |
|---|---|---|---|---|---|---|---|---|
| | | | | Pre-process specification mode expression | Post-process specification mode expression | | | |
| p1 | First process | 20A | 1 | Cell01.Start | p1.comp => p2 | Instruction program 1 | Process program 1 | Variable information 1 |
| p2 | Second process | 20A | 2 | p1.comp or p6.timeout | p2.comp => p3 and p4 and p5 and p6 | Instruction program 2 | Process program 2 | Variable information 2 |
| p3 | Third process | 20A | 3 | p2.comp | p3.comp => p7 | Instruction program 3 | Process program 3 | Variable information 3 |
| p4 | Fourth process | 20B | 4 | p2.comp | p4.comp => p7 | Instruction program 4 | Process program 4 | Variable information 4 |
| p5 | Fifth process | 20B | 5 | p2.comp | p5.comp => p7 | Instruction program 5 | Process program 5 | Variable information 5 |
| p6 | Sixth process | 20A | 6 | p2.comp or p7.abort | p6.comp => p7 or p6.timeout => p2 | Instruction program 6 | Process program 6 | Variable information 6 |
| p7 | Seventh process | 20A | 7 | p3.comp or p4.comp or p5.comp or p6.comp | p7.abort => p6 | Instruction program 7 | Process program 7 | Variable information 7 |

FIG. 12

| Offset | Variable name |
|---|---|
| 1115-1116 | Command request ID |
| 1117 | Main command |
| 1118 | Subcommand |
| 1119-1600 | Command data area |

FIG. 13

| Main command | Subcommand | Command data area |
|---|---|---|
| 1 (Robot control function) | 1 (Alarm reset) | None |
| | 2 (Power supply control) | On/Off value |
| | 3 (Job selection) | Job name, start portion, and the like |
| | 4 (Mode switching) | Mode information |
| | 5 (Job execution) | None |
| | 6 (Robot operation) | Position information or the like |
| | ⋮ | ⋮ |
| 2 (Monitoring function) | 1 (Monitor setting read out) | None |
| | 2 (Job information read out) | Job type information or the like |
| | ⋮ | ⋮ |
| 3 (Collection function) | 1 (Collection setting read out) | None |
| | 2 (Collection start) | None |
| | ⋮ | ⋮ |

FIG. 14
| Command request ID | 0 |
|---|---|
| Main command | – |
| Subcommand | – |
| Command data area | – |
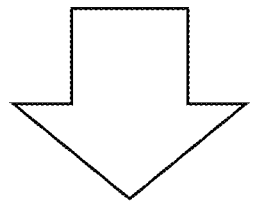
| Command request ID | 1 |
|---|---|
| Main command | 1 |
| Subcommand | 3 |
| Command data area | Job AAA 3rd line |
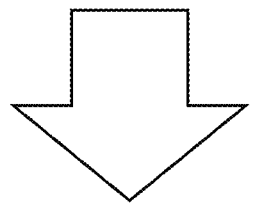
| Command request ID | 2 |
|---|---|
| Main command | 1 |
| Subcommand | 5 |
| Command data area | – |

Instruction program creation screen

Below is a list of the processes executed by the industrial machine (20A).
Please create instruction programs required for executing the processes.

| No | Process ID | Process name | Instruction program name |
|---|---|---|---|
| 1 | p1 | First process | p1 |
| 2 | p2 | Second process | p2 |
| 3 | p3 | Third process | p3 |
| 6 | p6 | Sixth process | p6 |
| 7 | p7 | Seventh process | p7 |

~L30

Create an instruction program ~B31

Completion ~B32

FIG. 20

| Main command | Subcommand | Template |
|---|---|---|
| 1 (Robot control function) | 1 (Alarm reset) | Template 1-1 |
| | 2 (Power supply control) | Template 1-2 |
| | 3 (Job selection) | Template 1-3 |
| | 4 (Mode switching) | Template 1-4 |
| | 5 (Job execution) | Template 1-5 |
| | 6 (Robot operation) | Template 1-6 |
| | ⋮ | ⋮ |
| 2 (Monitoring function) | 1 (Monitor setting read out) | Template 2-1 |
| | 2 (Job information read out) | Template 2-2 |
| | ⋮ | ⋮ |
| 3 (Collection function) | 1 (Collection setting read out) | Template 3-1 |
| | 2 (Collection start) | Template 3-2 |
| | ⋮ | ⋮ |

DB3

PROGRAM CREATION DEVICE, PROGRAM CREATION METHOD, AND PROGRAM

CROSS-REFERENCE TO RELATED APPLICATIONS

The present application is based upon and claims the benefit of priority to Japanese Patent Application No. 2020-216235, filed Dec. 25, 2020, the entire contents of which are incorporated herein by reference.

BACKGROUND OF THE INVENTION

Field of the Invention

The present invention relates to a program creation device, a program creation method, and a program.

Description of Background Art

Japanese Patent Application Laid-Open Publication No. 2011-238041 describes a program creation device that creates a program for controlling a robot used in a cell. The program creation device defines a work block including internal state information and a postcondition for each work unit of the robot, and uses a process flow in which multiple work blocks are arranged in a desired order to create a program such that the robot works in the desired order. The entire contents of this publication are incorporated herein by reference.

SUMMARY OF THE INVENTION

According to one aspect of the present invention, a creation device includes processing circuitry that acquires process information about multiple processes executed by one or more industrial machines, controls display, based on the process information of the processes, of a specification screen in which at least one of a pre-process and a post-process of each of the processes is specified, and creates a control program of a control device that controls the one or more industrial machines such that the processes are executed in an order specified using the specification screen.

According to another aspect of the present invention, a creation method includes acquiring, using processing circuitry, process information about multiple processes executed by one or more industrial machines, controlling, using the processing circuitry, display of a specification screen in which at least one of a pre-process and a post-process of each of the processes is specified based on the process information of the processes, and creating, using the processing circuitry, a control program of a control device that controls the one or more industrial machines such that the processes are executed in an order specified using the specification screen.

According to yet another aspect of the present invention, a non-transitory computer readable medium having stored thereon a control program created by a creation method including acquiring process information about multiple processes executed by one or more industrial machines, controlling display of a specification screen in which at least one of a pre-process and a post-process of each of the processes is specified based on the process information of the processes, and creating control program of a control device that controls the one or more industrial machines such that the processes are executed in an order specified using the specification screen.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 illustrates a data storage example of a machine information database;

FIG. 9 illustrates a data storage example of a process information database (DB2);

FIG. 12 illustrates a part of structure data included in a profile;

FIG. 13 illustrates an example of data stored in a main command, a subcommand, and a command data area;

FIG. 14 illustrates an example of changes of variables when a job is selected and executed;

FIG. 15 illustrates an example of an instruction program creation screen;

FIG. 20 illustrates an example of a template database;

DETAILED DESCRIPTION OF THE EMBODIMENTS

Figure 1:
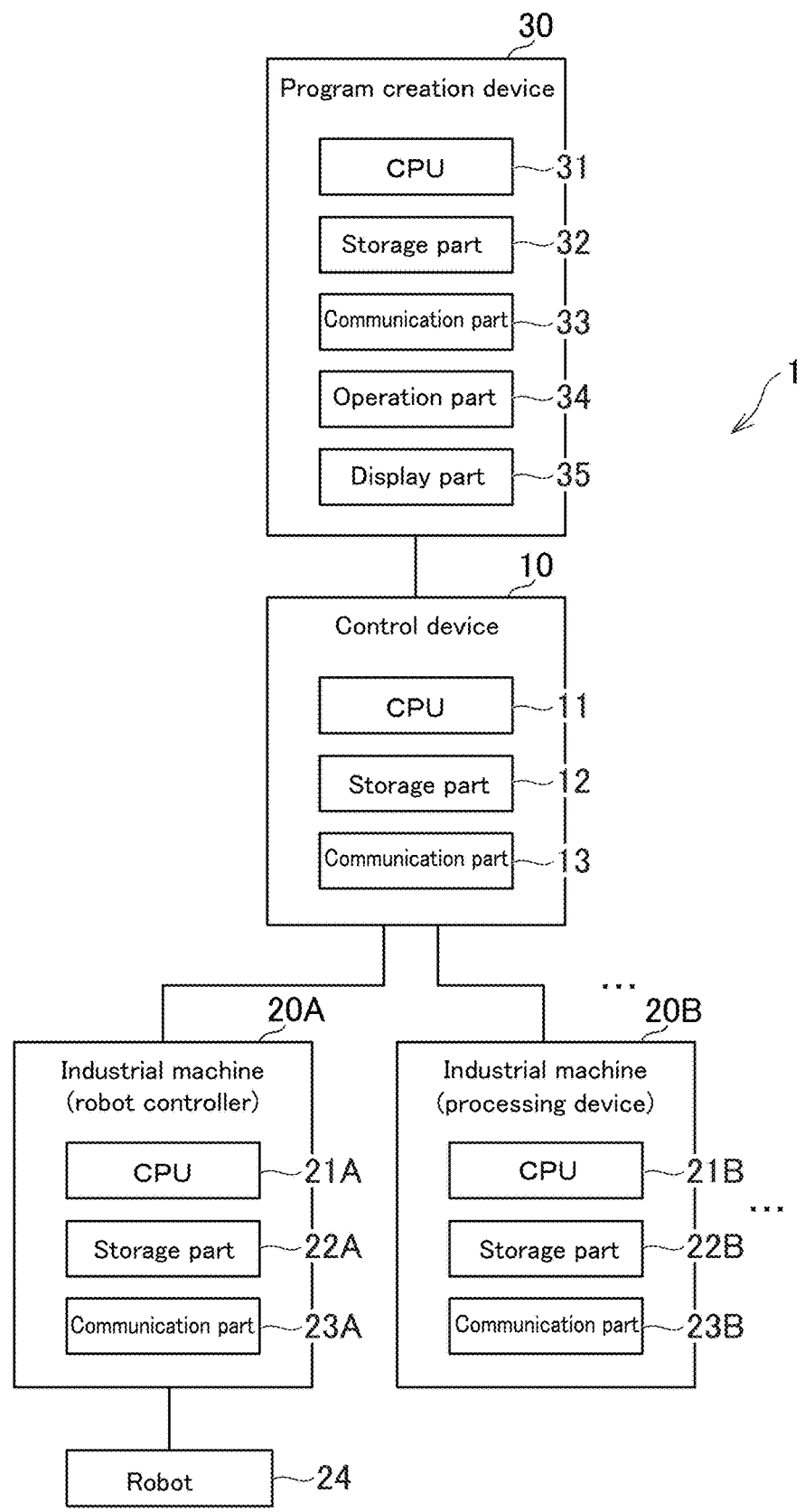
FIG. 1 illustrates an example of an overall structure of a control system.

Embodiments will now be described with reference to the accompanying drawings, wherein like reference numerals designate corresponding or identical elements throughout the various drawings.

1. First Embodiment

In the following, an example of a program creation device according to a first embodiment of the present invention is described. In the first embodiment, a control system including the program creation device is taken as an example.

1-1. Overall Structure of Control System

FIG. 1 illustrates an example of an overall structure of the control system. As illustrated in FIG. 1, a control system 1 includes a control device 10, industrial machines (20A, 20B), and a program creation device 30. The devices are communicatively connected to each other by a general network such as an Ethernet (registered trademark) or by an industrial network (so-called field network). In the following, when the industrial machines (20A, 20B) are not distinguished, the last alphabet is omitted and the industrial machines (20A, 20B) are simply described as industrials machine 20.

The control device 10 is a computer that controls one or more industrial machines 20. The control device 10 can control any number of industrial machines 20. When the entire control system 1 is referred to as a cell, the control device 10 may be referred to as a cell controller. The control device 10 may be a device having another name such as a PLC (Programmable Logic Controller). The control device 10 includes a CPU 11, a storage part 12, and a communication part 13. The CPU 11 includes at least one processor. The CPU 11 is a type of circuitry. The storage part 12 includes at least one of a volatile memory and a non-volatile memory. The communication part 13 includes at least one of a communication interface for wired communication and a communication interface for wireless communication.

The industrial machine 20 is a device for performing a work on behalf of a person. For example, the industrial machine (20A) is a robot controller that controls a robot 24, and the industrial machine (20B) is a processing device. The industrial machines 20 may each be of any type, for example, may each be a motor controller, a motion controller, a servo amplifier, a numerical control device, a power conversion device, an inspection device, or a measuring device. The industrial machines 20 each include a CPU 21, a storage part 22, and a communication part 23. Physical structures of the CPU 21, the storage part 22, and the communication part 23 may be respectively the same as those of the CPU 11, the storage part 12, and the communication part 13. In the present embodiment, since structures of the CPU (21A) and the like in FIG. 1 are not distinguished, the alphabet is omitted and they are simply referred to as the CPU 21 and the like.

The program creation device 30 is a device operated by a user. For example, the program creation device 30 is a personal computer, a tablet terminal, or a smartphone. For example, the program creation device 30 includes a CPU 31, a storage part 32, a communication part 33, an operation part 34, and a display part 35. Physical structures of the CPU 31, the storage part 32, and the communication part 33 may be respectively the same as those of the CPU 11, the storage part 12, and the communication part 13. The operation part 34 is an input device such as a mouse or a keyboard. The display part 35 is a liquid crystal display or an organic EL display.

A program and data stored in each of the storage parts (12, 22, 32) may be supplied via a network. Further, the hardware structures of the devices are not limited to those of the above examples, and various hardware structures can be adopted. For example, a reading part (such as a memory card slot) that reads a computer-readable information storage medium or an input-output part (such as a USB terminal) for connecting to an external device may be included. In this case, a program or data stored in the information storage medium may be supplied via the reading part or the input-output part. In addition, for example, a circuit referred to as an FPGA or an ASIC may be included.

1-2. Overview of Control System

In the control system 1, multiple processes are executed in a predetermined order with respect to each of multiple objects. The objects are each an object of a work. The objects are also each referred to as a workpiece. The objects may each be any of a final product, an intermediate product, a material, or a raw material. The objects may each be of any type, for example, may each be a semiconductor, an electrical appliance, an automobile, a food, a beverage, a pharmaceutical, or a daily necessity. The processes are each a work with respect to an object. The processes can be said to be operations of the industrial machines 20.

Figure 2:
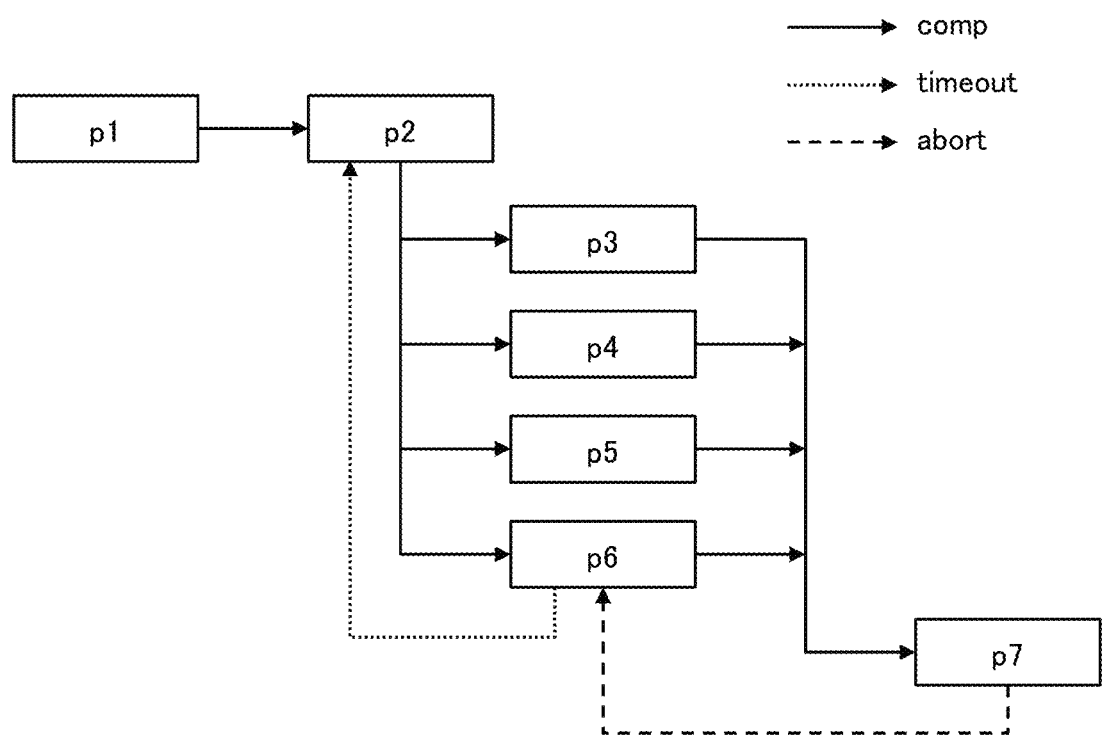
FIG. 2 illustrates an example of a process order in the control system.

FIG. 2 illustrates an example of a process order in the control system 1. In the present embodiment, a case is described where processes (p1-p7) are executed in the order illustrated in FIG. 2 with respect to each of multiple objects. In the example of FIG. 2, the order of the processes (p1-p7) is indicated using three types of arrows: "complete," "timeout," and "abort." Execution conditions described below are distinguished depending on the types of the arrows. In the following, when it is not necessary to distinguish the processes (p1-p7), the reference numeral symbols of "p1"-"p7" are omitted.

The processes (p1-p7) may each be of any type, for example, may each be carrying in, moving (carrying), measuring, processing, cleaning, inspecting, or carrying out of an object. The process (p1) is a process to be executed first. A predetermined execution condition is set for the process (p1). For example, the process (p1) starts when any execution condition such as that the power is turned on for the industrial machines 20 or that all the processes for a previous object have completed is satisfied.

An execution condition of the process (p2) is the completion of the process (p1). When the process (p1) is completed, the process (p2) starts. An execution condition of each of the process (p3)—process (p6) is the completion of the process (p2). When the process (p2) is completed, the processes (p3-p6) start. The processes (p3-p6) are executed in parallel. When the process (p6) does not complete after a certain period of time and times out, the process (p2) is executed again. Therefore, the time-out of the process (p6) is an execution condition of the process (p2).

An execution condition of the process (p7) is the completion of each of the processes (p3-p6). Since the process (p7) is executed each time each of the processes (p3-p6) is completed, the process (p7) is executed four times for each object. When the process (p7) is aborted midway, the process (p6) is executed again. Therefore, the abort of the process (p7) is an execution condition of the process (p6).

When the process (p7) for an object is completed, all the processes for the object are completed. After that, the processes (p1-p7) are executed in the same order for the next object. After all the processes for an object have been completed, it is also possible that, instead of starting the process (p1) for the next object, a process for one object and a process for another object are executed in parallel.

A user creates a control program for the control device 10 such that the processes (p1-p7) are executed in the order illustrated in FIG. 2. The control program is a program for controlling the entire control system 1, and thus is also referred to as a cell program. The control program defines an overall flow of FIG. 2. A flow instructing the industrial machines 20 regarding their processes is defined in instruction programs separate from the control program. It is also possible that the control program and the instruction programs are not separated but are integrated into one program.

The execution conditions of the processes indicated by the arrows in FIG. 2 are defined in the control program. The control device 10 executes the control program to determine whether or not the execution conditions of the processes are satisfied. When an execution condition of a certain process is satisfied, the control device executes an instruction program for transmitting an execution instruction of the process, and transmits the execution instruction of the process to an industrial machine 20 that executes the process. Upon receiving the execution instruction, the industrial machine 20 executes a process program in which a specific operation of the process instructed to be executed is defined. Therefore, in the first embodiment, there are mainly three types of programs: a control program and instruction programs executed by the control device 10, and process programs executed by the industrial machines 20.

An instruction program may be created using a template as in a second embodiment to be described later. However, in the first embodiment, a method for creating an instruction program does not matter. For example, a user may create an instruction program using a ladder language, a robot language, or the like without using a template of the second embodiment. In the present embodiment, seven instruction programs that respectively correspond to the processes (p1-p7) are created in advance.

A user creates a control program such that the instruction programs of the processes (p1-p7) are called in the order illustrated in FIG. 2. In the first embodiment, an engineering tool for maintenance of the industrial machines 20 and the like is installed in the program creation device 30, and a user creates a control program using the engineering tool. For example, when a user operates the program creation device 30 to launch the engineering tool, a control program creation screen is displayed in the display part 35.

Figure 3:
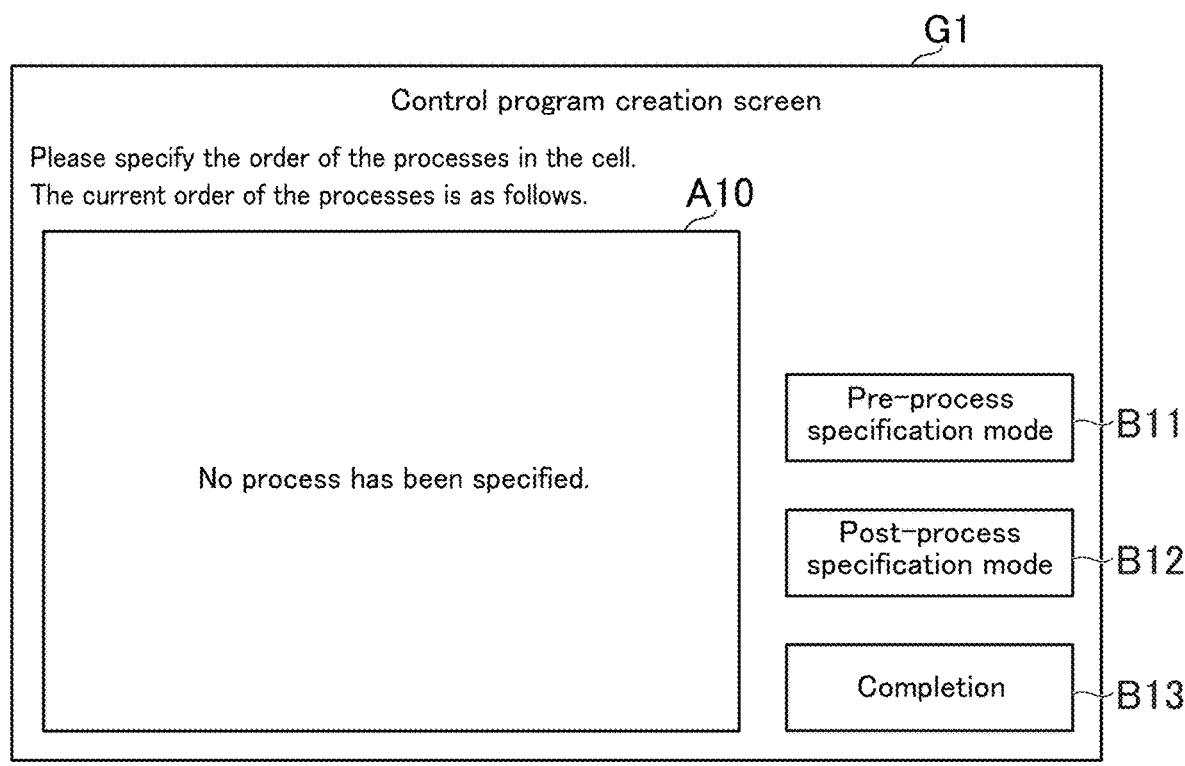
FIG. 3 illustrates an example of a control program creation screen.

FIG. 3 illustrates an example of the control program creation screen. As illustrated in FIG. 3, the control program creation screen (G1) is a user interface for creating a control program. In the first embodiment, a user can create a control program simply by specifying an order of processes without describing commands using the ladder language, the robot language, or the like. For example, as methods of specifying the order of the processes, there are a pre-process specification mode and a post-process specification mode.

The pre-process specification mode is a mode for specifying a pre-process that is a process executed before a certain process. That is, the pre-process specification mode is a mode in which a pre-process is specified as an execution condition of a certain process. In the present embodiment, a case is described where a pre-process is a process immediately before a certain process. However, it is also possible that a pre-process is a process two or more processes before a certain process. Multiple processes may be specified as pre-processes.

The post-process specification mode is a mode for specifying a post-process that is a process executed after a certain process. That is, the post-process specification mode is a mode in which a certain process (a process corresponding to a pre-process when viewed from a post-process) is specified as an execution condition of a post-process. In the present embodiment, a case is described where a post-process is a process immediately after a certain process. However, it is also possible that a post-process is a process two or more processes after a certain process. Multiple processes may be specified as post-processes.

A user can specify an order of the processes using any one of the pre-process specification mode and the post-process specification mode. The order of the processes specified by the user is displayed in a display region (A10) of the control program creation screen (G1). In the example of FIG. 3, since the user has not specified anything yet, nothing is displayed in the display region (A10). The user can switch between the pre-process specification mode and the post-process specification mode by selecting between buttons (B11, B12). For example, when the user selects the button (B11), a specification screen, which is a user interface for specifying an order of processes in the pre-process specification mode, is displayed in the display part 35.

Figure 4:
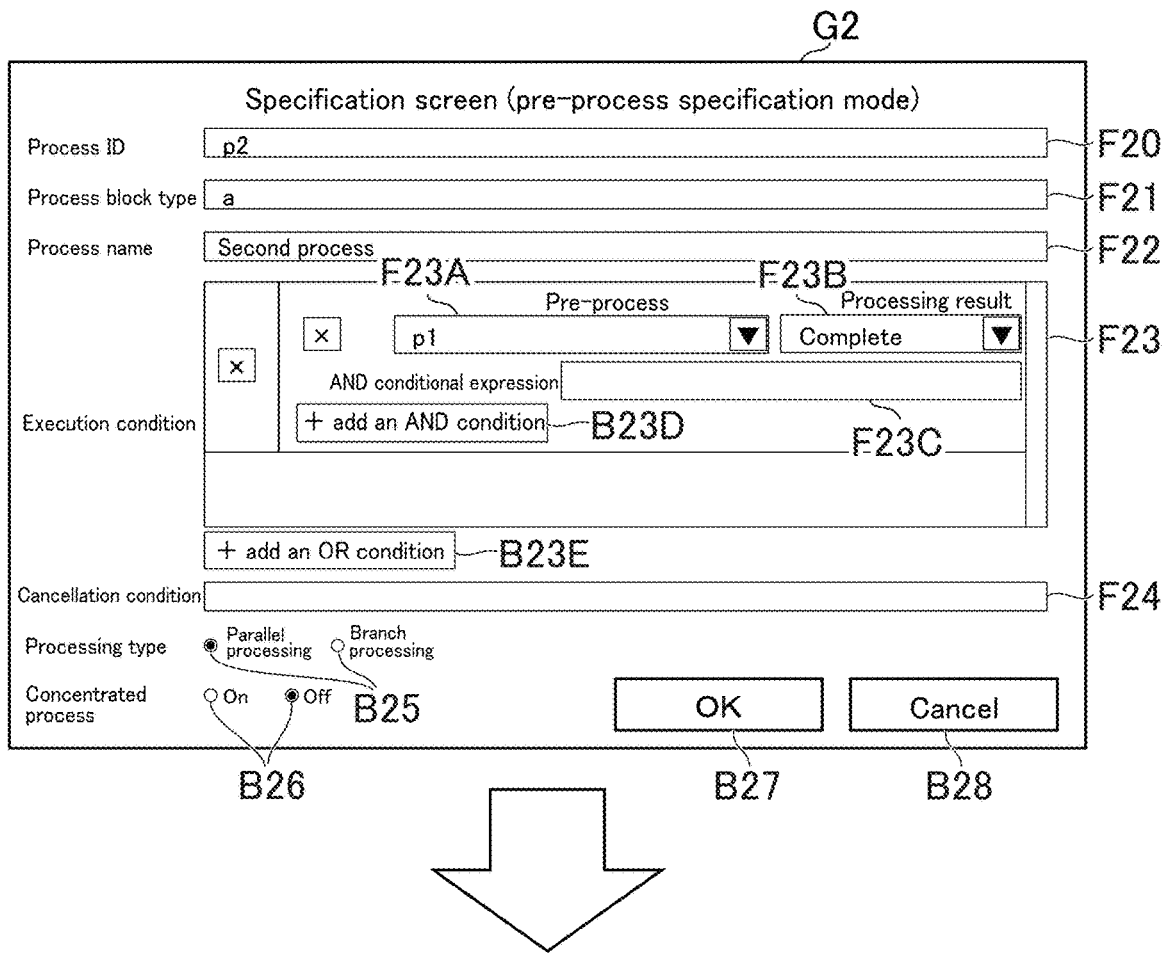
FIG. 4 illustrates an example of a specification screen of a pre-process specification mode.

FIG. 4 illustrates an example of the specification screen of the pre-process specification mode. As illustrated in FIG. 4, input forms (F20-F24) and buttons (B25-B28) are displayed in a specification screen (G2) of the pre-process specification mode. In the following, using as an example a case where the user specifies a pre-process of the process (p2), an operation with respect to the specification screen (G2) of the pre-process specification mode is described. Since the process (p2) is executed when the process (p1) is completed, the user specifies the completion of the process (p1) as an execution condition of the process (p2). That is, the user specifies the process (p1) as a pre-process of the process (p2).

First, in input forms (F20-F22), as information for identifying the process (p2) for which a pre-process is to be specified, the user specifies a process ID of the process (p2), a process block type indicating a type of the process (p2), and a name of the process (p2). When the process (p2) is specified in advance before the specification screen (G2) is displayed, the input forms (F20-F22) may be grayed out so that the process ID, the process block type, and the process name cannot be specified.

The user specifies a pre-process of the process (p2) in an input form (F23). That is, the user specifies an execution condition of the process (p2) in the input form (F23). For example, the user specifies a process ID of the process (p1), which is a pre-process, in the input form (F23A). In the input form (F23A), process IDs of other processes as candidates of a pre-process may be displayed with a pull-down menu or the like. The user may specify a pre-process from the pull-down menu or the like, or may directly input a process ID of a pre-process in the input form (F23A).

Further, for example, the user specifies a processing result of the process (p1), which is a pre-process, in an input form (F23B). The processing result is a status of the pre-process. For example, the processing result indicates whether or not the pre-process has normally completed. In the present embodiment, there are multiple processing results. For example, there are three processing results, "complete," "timeout," and "abort" indicated by the arrows in FIG. 2. The processing results are not limited to those in the example of the present embodiment, and there may be any processing result. For example, there may be processing results such as "error," "recovery," and "interrupt."

In the input form (F23B), candidate processing results may be displayed with a pull-down menu or the like. The user may specify a processing result from the pull-down menu or the like, or may directly input a processing result in the input form (F23B). For example, the user specifies "complete" in the input form (F23B). By the above operation, the completion of the process (p1) is specified as an execution condition of the process (p2). That is, an order of the process (p1) and the process (p2) is specified.

The user can specify multiple conditions as execution conditions. The user can specify at least one of an AND condition and an OR condition for multiple conditions. For example, the user can specify another condition as an AND condition in an input form (F23C). The another condition does not have to be a processing result of a process, and may be, for example, a condition such as a value of a variable or a sensor signal that is not related to a processing result. The user can select a button (B23D) to add an AND condition. When the button (B23D) is selected, input forms (F23A-F23C) for specifying an AND condition are added. An upper limit may be set for the number of AND conditions that can be specified by a user.

The user selects a button (B23E) when the user wants to specify an OR condition. When the button (B23E) is selected, input forms (F23A-F23C) for specifying an OR condition are added. Since the process (p2) is also executed when the process (p6) times out, the user selects the button (B23E) and specifies, as an OR condition, a process ID of the process (p6), which is a pre-process, and a processing result of "timeout." As a result, the execution conditions of the process (p2) are OR conditions of the completion of the process (p1) and the timeout of the process (p6).

The user can specify a cancellation condition equivalent to abort in an input form (F24). In the flow of FIG. 2, the abort of the process (p2) is not considered, and thus, the user does not specify anything in the input form (F24). For a process for which abort is considered such as the process (p6), a cancellation condition is specified in the input form (F24). The cancellation condition may be any condition, for example, may be a condition such as a value of a predetermined variable, a sensor signal, or a state of an object.

The user can select the button (B25) and specify a processing type of the process (p2). The processing type is the type of the process (p2). In the present embodiment, as processing types, parallel processing and branch processing are prepared. Parallel processing is processing that can be executed multiple times for a certain object. Branch processing is processing that can be executed only once for a certain object. Since the process (p2) is not re-executed unless the process (p6) is aborted, as illustrated in FIG. 4, the user specifies parallel processing for the process (p2).

The user can select the button (B26) and specify presence or absence of a concentrated process for the process (p2). A concentrated process is a process for which a large number of pre-processes exist. In the present embodiment, an upper limit is set for the number of OR conditions that can be specified by a user, and this upper limit is lifted for a concentrated process. For example, for a non-concentrated process, the upper limit is limited to about 10, and, for a concentrated process, the upper limit is about 50. Other than OR conditions, an upper limit for the number of AND conditions may be lifted. Further, an upper limit for a total number of OR conditions and AND conditions may be set, and this upper limit may be lifted.

When the user selects the button (B27), the specification of the pre-process of the process (p2) can be completed. After that, while keeping the pre-process specification mode, the user can specify pre-processes for the other processes (p3-p7). For example, the user specifies the processes (p2, p7) as pre-processes of the process (p6), and specifies the completion of the process (p2) and the abort of the process (p7) as OR conditions. Further, for example, the user specifies the processes (p3-p6) as pre-processes of the process (p7), and specifies the completion of each of the processes (p3-p6) as an OR condition. When the user selects the button (B28), the specified contents are discarded without being saved.

The user may specify the execution conditions of all the processes in the pre-process specification mode. However, for example, when there are multiple processes (p3-p6) as pre-processes as in the case of the process (p7), it may be easier to specify the order of the processes in the post-process specification mode. For example, when the user selects the button (B12) of the control program creation screen (G1), a specification screen (G2), which is a user interface for specifying the order of the processes in the post-process specification mode, is displayed in the display part 35.

Figure 5:
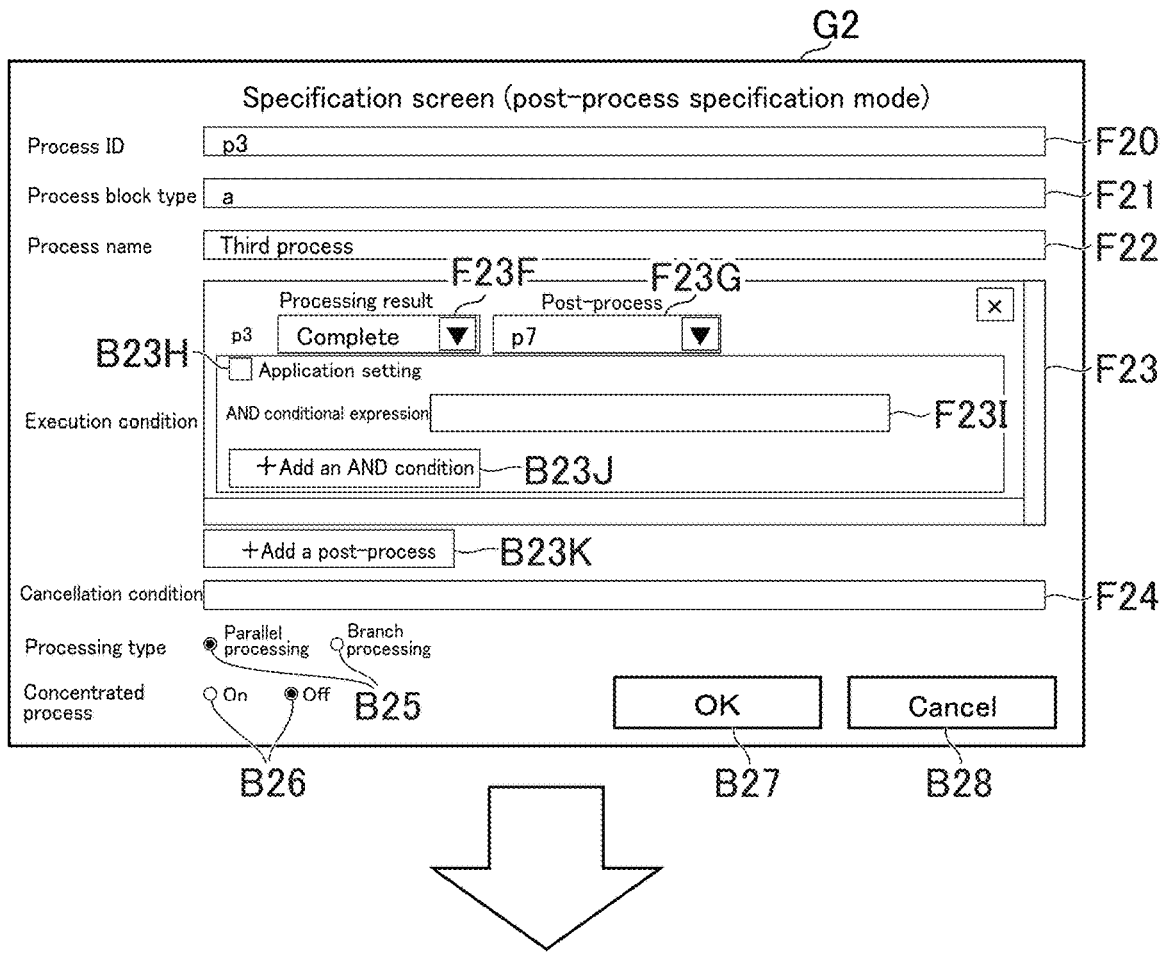
FIG. 5 illustrates an example of the specification screen of a post-process specification mode.

FIG. 5 illustrates an example of the specification screen (G2) of the post-process specification mode. In the following, a case where the user specifies a post-process of the process (p3) in the pre-process specification mode is described as an example. As illustrated in FIG. 5, the specification screen (G2) of the post-process specification mode has a layout that is partially in common with that of the specification screen (G2) of the pre-process specification mode, and is different from the specification screen (G2) of the pre-process specification mode in the part for specifying an execution condition.

The user specifies a processing result of the process (p3) in an input form (F23F). Since the process (p7), which is a post-process of the process (p3), is executed when the process (p3) is completed, the user specifies "complete" in the input form (F23F). Similar to the input form (F23B) of FIG. 4, the input form (F23F) may display a pull-down menu or the like. The user specifies in an input form (F23G) a process ID that allows the process (p7), which is a post-process of the process (p3), to be uniquely identified. Similar to the input form (F23A) of FIG. 4, the input form (F23G) may display a pull-down menu or the like.

The user checks a check box (B23H) when specifying an AND condition as an execution condition of the post-process. The user specifies an AND condition in the input form (F23). When there are two or more AND conditions, the user selects a button (B23J) to specify the second and subsequent AND conditions. In the flow of FIG. 2, the execution condition of the process (p7), which is a post-process of the process (p3), does not include an AND condition, and thus, the user does not specify an AND condition.

When there are two or more post-processes, the user can select a button (B23K) to add a post-process. For example, when not only the process (p7) but also a process (p8) that does not exist in FIG. 2 is executed after the process (p3), the user selects the button (B23K) to add the process (p8). In the case of the process (p2), since there are four post-processes: the processes (p3-p6), when the user specifies an execution condition of the process (p2) in the post-process specification mode, the user selects the button (B23K) to specify these four post-processes.

Since the process (P7) is executed when each of the processes (P3-P6) is completed, the user can specify the process (p7) as a post-process from the specification screen (G2) in the post-process specification mode, not only for the process (P3) but also for each of the processes (P4-P6). The user may specify the execution conditions of the processes (p1-p7) from the specification screens (G2) of at least one of the pre-process specification mode and the post-process specification mode. The execution conditions specified by the user are reflected in the display region (A10) of the control program creation screen (G1).

Figure 6:
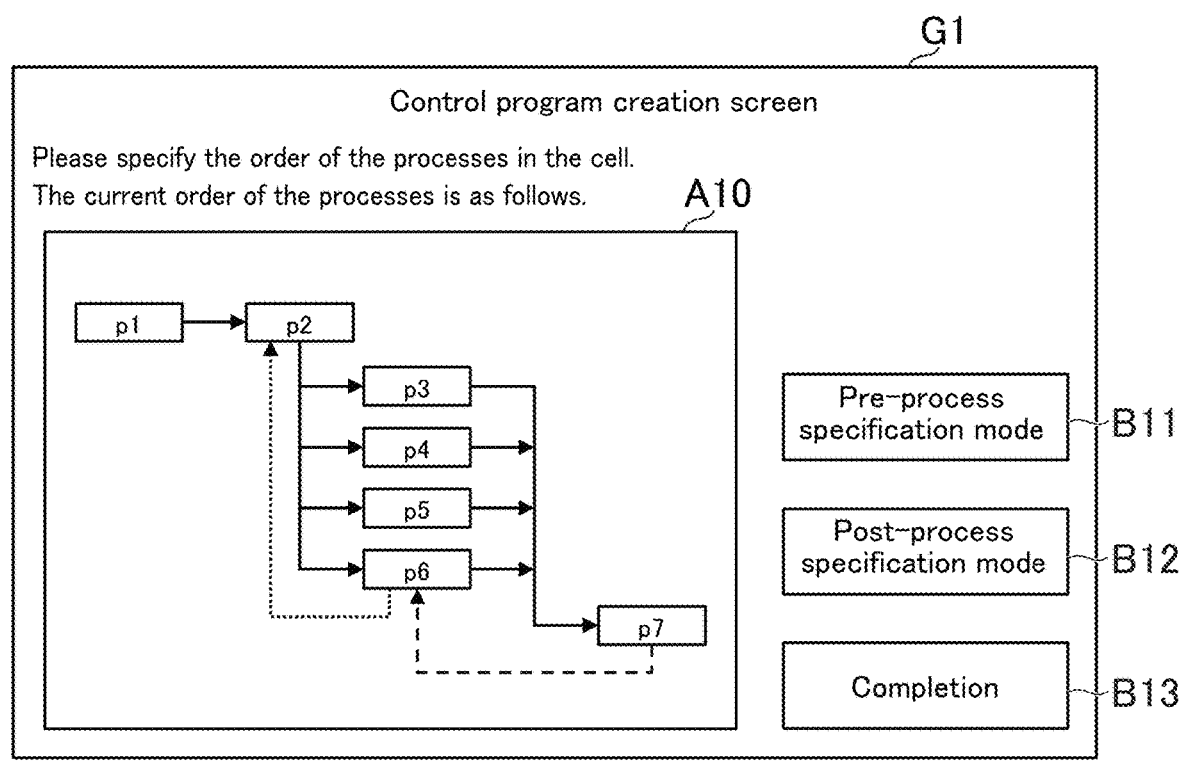
FIG. 6 illustrates an example of a control program creation screen when an order of processes has been specified.

FIG. 6 illustrates an example of the control program creation screen (G1) when the order of the processes has been specified. As illustrated in FIG. 6, the order of the processes (p1-p7) specified by the user is displayed in the display region (A10) of the control program creation screen (G1). For example, boxes that respectively indicate the processes (p1-p7) are displayed such that the processes (p1-p7) are arranged according to the order of the processes (p1-p7), and arrows connecting the boxes are displayed to indicate the execution conditions of the processes (p1-p7).

When the user confirms that the processes (p1-p7) are in the desired order, the user selects a button (B13) to create a control program. When the button (B13) is selected, the program creation device 30 creates a control program such that the processes (p1-p7) are executed in the order shown in the display region (A10). A specific method for creating a control program from the order specified by the user will be described later.

As described above, the program creation device 30 of the present embodiment allows the user to specify the order of the processes using the specification screen (G2) of at least one of the pre-process specification mode and the post-process specification mode. When the user specifies the order of the processes from the specification screen (G2), a control program can be created without using the ladder language, the robot language, or the like, and thus, the creation of the control program can be simplified. In the following, details of the control system 1 of the present embodiment are described.

1-3. Functions Realized by First Embodiment

Figure 7:
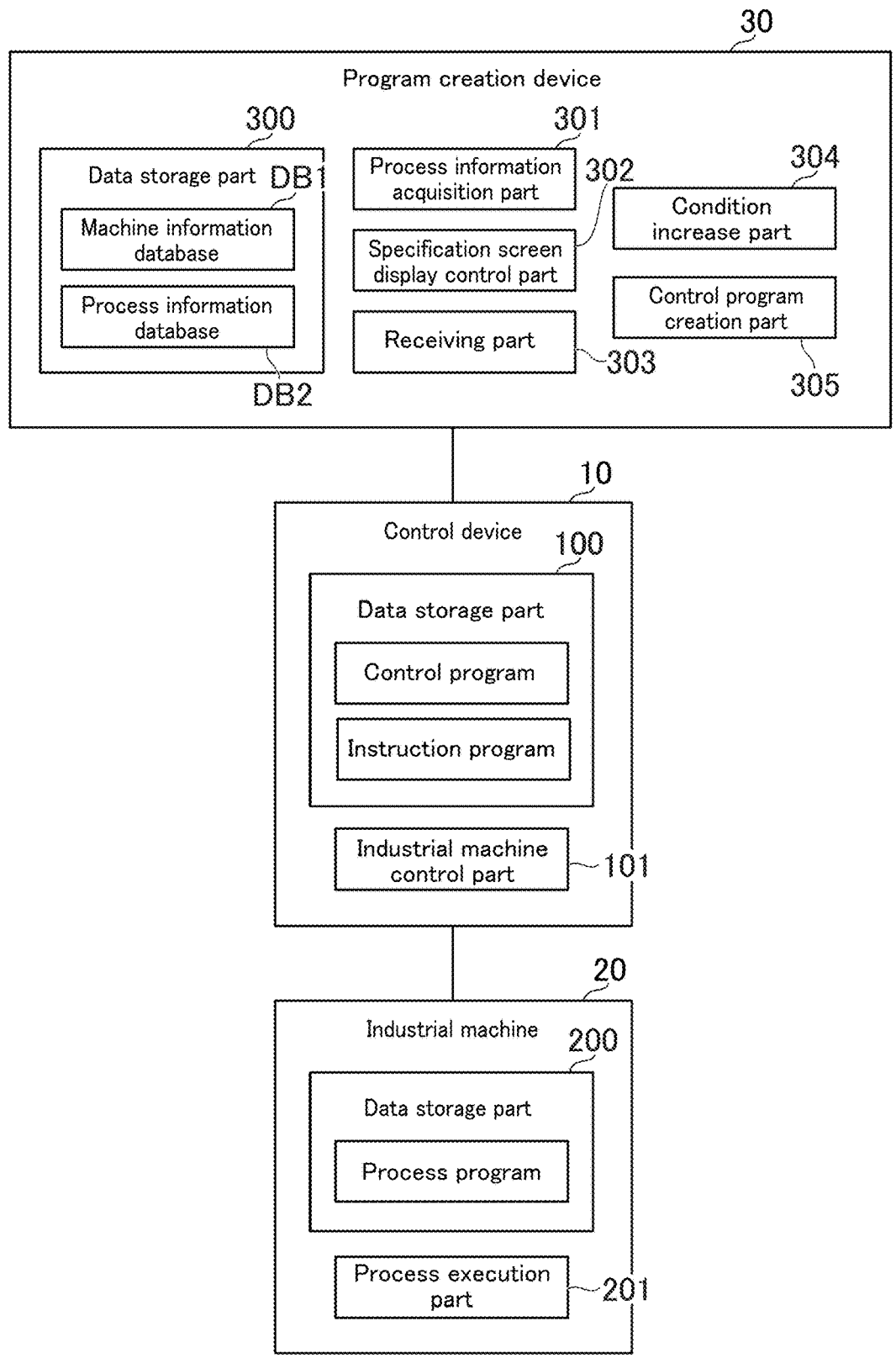
FIG. 7 is a functional block diagram illustrating functions realized by a control system of a first embodiment.

FIG. 7 is a functional block diagram illustrating functions realized by the control system 1 of the first embodiment. In the present embodiment, functions realized by the control device 10, the industrial machines 20, and the program creation device 30 are described.

1-3-1. Functions Realized by Control Device

As illustrated in FIG. 7, the control device 10 includes a data storage part 100 and an industrial machine control part 101. The data storage part 100 is mainly realized by the storage part 12. The industrial machine control part 101 is mainly realized by the CPU 11.

Data Storage Part

The data storage part 100 stores data required for controlling the industrial machines 20. For example, the data storage part 100 stores the control program created by the control program creation part 305 and the instruction programs created in advance. Further, for example, the data storage part 100 stores variables for which at least one of referencing and changing is performed by at least one of the control program and the instruction programs. These variables are used for controlling the processes. A start variable and an end variable to be described later are examples of the variables. A main command to be described in a second embodiment to be described later is also an example of the variables. Details on how to use the variables will be described later.

The data storage part 100 may store the same variables stored in a data storage part 200 of each of the industrial machines 20. In this case, integrity between the variables in the data storage part 100 and the variables in the data storage part 200 is maintained. Variable integrity may be periodically or non-periodically maintained. The variables are not limited to those related to controlling the processes, and there can be various variables such as a variable indicating a physical quantity detected by a sensor.

Industrial Machine Control Part

Based on the control program, the industrial machine control part 101 controls the industrial machines 20 such that the processes are executed in a predetermined order. For example, based on the control program, the industrial machine control part 101 transmits execution instructions of the processes from the control device 10 to one or more industrial machines 20. In the present embodiment, the industrial machine control part 101 causes each of the industrial machines 20 to execute a process by changing a variable corresponding to the process. Therefore, an execution instruction of a process can be said to be a variable change instruction.

For example, for each process, a start variable for starting the process and an end variable that indicates whether or not the process has ended (completed) are defined. The start variable and the end variable of each process are stored in an industrial machine 20 that executes the process. In the data storage part 100, the same start variable and end variable stored in the industrial machine 20 are stored, and integrity is mutually maintained. The industrial machine control part 101 causes an industrial machine 20 to execute each process by controlling the start variable and the end variable of the each process.

In the example of FIG. 2, the industrial machine control part 101 executes the control program and determines whether or not the execution condition of the process (p1) is satisfied. When it is determined that the execution condition of the process (p1) is satisfied, The industrial machine control part 101 calls the instruction program corresponding to the process (p1) and transmits an execution instruction of the process (p1) to an industrial machine 20 that executes the process (p1). This execution instruction is an instruction for changing the start variable of the process (p1) from a first value (for example, 0) to a second value (for example, 1).

For example, the industrial machine control part 101 may change the start variable corresponding to the process (p1) stored in the data storage part 100 to the second value, and transmit an execution instruction indicating that the integrity of this start variable is to be maintained to an industrial machine 20 that executes the process (p1). When the industrial machine 20 receives the execution instruction, a process execution part 201 (to be described later) changes the start variable of the process (p1) to the second value. Upon detecting that the start variable of the process (p1) has changed to the second value, the process execution part 201 executes a process program of the process (p1) and starts the process (p1).

Upon executing the process program of the process (p1) to a last portion, the process execution part 201 changes the end variable of the process (p1) from a first value (for example, 0) to a second value (for example, 1). The process execution part 201 transmits to the control device 10 a response indicating that the end variable of the process (p1) has changed to the second value. When the control device 10 receives the response, the industrial machine control part 101 changes the end variable of the process (p1) stored in the data storage part 100 to the second value.

Upon detecting that the end variable of the process (p1) has changed to the second value, the industrial machine control part 101 determines that the execution condition of the process (p2) is satisfied, and calls the instruction program corresponding to the process (p2). After that, in the same manner thereafter, the industrial machine control part 101 controls the start variable and the end variable of each of the processes until the final process (p7) is completed.

In the present embodiment, since a timeout and an abort are also specified as execution conditions, there may be a timeout variable indicating a timeout and an abort variable indicating an abort. In this case, similar to the start variable and the end variable, the industrial machine control part 101 may detect a timeout and an abort by referencing the timeout variable and the abort variable.

For example, for the process (p2), since a timeout of the process (p6) is also an execution condition, the industrial machine control part 101 references the timeout variable of the process (p6) and detects a timeout of the process (p6). Upon detecting a timeout of the process (p6), the industrial machine control part 101 determines that an execution condition of the process (p2) is satisfied, and calls the instruction program corresponding to the process (p2). Further, for example, for the process (p6), since an abort of the process (p7) is also an execution condition, the industrial machine control part 101 references the abort variable of the process (p7) and detects an abort of the process (p7). Upon detecting an abort of the process (p7), the industrial machine control part 101 determines that an execution condition of the process (p6) is satisfied, and calls the instruction program corresponding to the process (p6).

A method for controlling the industrial machines 20 is not limited to a method using variables, and various methods can be used. For example, the industrial machine control part 101 may control an industrial machine 20 by transmitting to the industrial machine 20 a command indicating a process to be executed. The industrial machine 20 may identify the process to be executed by referencing the received command, and start the process by executing a process program of the process.

1-3-2. Functions Realized by Industrial Machines

In an industrial machine 20, the data storage part 200 and the process execution part 201 are realized. The data storage part 200 is mainly realized by the storage part 22. The process execution part 201 is mainly realized by the CPU 21. The industrial machines (20A, 20B) illustrated in FIG. 1 have the same function, and thus are described simply as the industrial machines 20.

Data Storage Part

The data storage part 200 stores data required for executing the processes. For example, the data storage part 200 stores the process programs. The process programs are respectively prepared for the processes. Operations of the processes are respectively defined in the process programs. Further, for example, the data storage part 200 stores variables for which at least one of referencing and changing is performed by the process programs. The variables include variables as execution conditions for executing the process programs. For example, a start variable and an end variable are prepared for each of the processes (for each of the process programs). As described above, it is also possible that the execution of the process programs is controlled by commands from the control device 10 rather than by variables.

Process Execution Part

The process execution part 201 executes the processes based on the process programs. When an execution instruction for a certain process is received from the control device 10, the process execution part 201 starts the process by executing the process program of the process. In the present embodiment, since a start variable and an end variable are prepared for each of the process programs, the process execution part 201 determines whether or not the start variable has changed from the first value to the second value. The processing by the process execution part 201 after detecting that the start variable has changed to the second value is as described above. The start variable and the end variable that have each changed to the second value each return to the first value at a predetermined timing.

The process execution part 201 may execute a process to be executed by itself based on an execution condition different from receiving an execution instruction from the control device 10. That is, even when an execution instruction of a process is received from the control device 10, the process execution part 201 does not have to execute the process unless other execution conditions are satisfied. The other execution conditions may be conditions that can be determined by the industrial machines 20, for example, that delay of an object is not occurring, that an error is not occurring, or that other industrial machines 20 are in predetermined states. The other execution conditions are determined based on a detection signal of a sensor connected to the industrial machines 20, or communication contents with other industrial machines 20. The sensor may be of any type, for example, a torque sensor, a vision sensor, a motor encoder, a temperature sensor, a grip sensor, a temperature sensor, or the like.

1-3-3. Functions Realized by Program Creation Device

As illustrated in FIG. 7, the program creation device 30 includes a data storage part 300, a receiving part 303, a condition increase part 304, a process information acquisition part 301, a specification screen display control part 302, and a control program creation part 305. The data storage part 300 is mainly realized by the storage part 32. The receiving part 303, the condition increase part 304, the process information acquisition part 301, the specification screen display control part 302, and the control program creation part 305 are mainly realized by the CPU 31.

Data Storage Part

The data storage part 300 stores data required for performing setting in the control system 1. For example, the data storage part 300 stores a machine information database (DB1) and a process information database (DB2).

FIG. 8 illustrates a data storage example of the machine information database (DB1). As illustrated in FIG. 8, the machine information database (DB1) is a database that stores machine information related to the industrial machines 20 that are the control objects of the control device 10. For example, the machine information database (DB1) stores: a cell name; a name, a type, a register range, and a communication setting for each of the industrial machines 20; and control program information. When there are multiple cells, information about these is stored for each of the cells.

The user uses an engineering tool to create machine information as settings of the industrial machines 20. For example, the user specifies a name, a type, a register range, and a communication setting for each of the industrial machines 20, which are control objects of the control device 10, from the engineering tool. These specified contents are stored in the machine information database (DB1). The control program information is information about the control program created by the control program creation part 305, for example, is information about a file name of the control program or about the related instruction programs.

In the present embodiment, for each industrial machine 20, a register range for controlling the industrial machine 20 is defined. A register range dedicated to each industrial machine 20 is set such as that, for example, registers in a register range of 0-4999 of the control device 10 are used for controlling the industrial machine (20A) and registers in a register range of 5000-12000 of the control device 10 are used for controlling the industrial machine (20B). For example, as a register range, a leading register number and an ending register number are stored. A register is a storage area of a memory in the control device 10.

FIG. 9 illustrates a data storage example of the process information database (DB2). As illustrated in FIG. 9, the process information database (DB2) stores process information about the processes executed by the individual industrial machines 20. For example, the process information database (DB2) stores process IDs, names of the processes, names of the industrial machines 20, a process execution order, execution conditions of the processes, instruction program information, process program information, and variable information about variables such as the start variable and the end variable.

The user uses an engineering tool to create process information as settings of the processes. For example, the user specifies the process IDs and the names of the processes, which are executed by the industrial machines 20, from the engineering tool. These specified contents are stored in the process information database (DB2).

For the order and execution conditions stored in the process information database (DB2), the contents specified from the specification screen (G2) in the pre-process specification mode or the post-process specification mode are stored. In FIG. 9, the execution conditions that are respectively expressed in the modes are illustrated. However, these execution conditions can be converted to each other and it is possible that only one execution condition is stored. Although omitted in FIG. 9, information such as a cancellation condition, a processing type, and presence or absence of a concentrated process may also be stored in the process information database (DB2).

The instruction program information is information about the instruction programs created by the user, and includes, for example, file names of the instruction programs, names of the industrial machines 20 to be instructed, and comments. The process program information is information about the process programs created by the user, and includes, for example, file names of the process programs, the names of the industrial machines 20 that execute the process programs, and comments. The variable information is information about the variables used in the processes. For example, information about the start variables, the end variables and the like of the processes is stored as the variable information.

The data stored by the data storage part 300 is not limited to the above examples. For example, the data storage part 300 stores the engineering tool. The engineering tool is used for various purposes such as creation of various programs, parameter setting, communication setting between devices, register definition, or variable definition. Further, for example, the data storage part 300 may store a program created by a user using the engineering tool or a backup of parameters.

Process Information Acquisition Part

The process information acquisition part 301 acquires process information about multiple processes executed by one or more industrial machines 20. In the present embodiment, since the process information is stored in the process information database (DB2), the process information acquisition part 301 acquires the process information stored in the process information database (DB2). For example, the process information acquisition part 301 acquires process information about a process for which a pre-process or a post-process is specified on the specification screen (G2). The process information may be included in a database other than the process information database (DB2). Further, the process information may be stored in a computer other than the program creation device 30.

Specification Screen Display Control Part

Based on the process information of the processes, the specification screen display control part 302 displays the specification screen (G2) for specifying at least one of a pre-process and a post-process for each process. In the present embodiment, the case is described where the specification screen display control part 302 displays both the specification screen (G2) of the pre-process specification mode and the specification screen (G2) of the post-process specification mode. However, it is also possible that the specification screen display control part 302 displays only one of the specification screen (G2) of the pre-process specification mode and the specification screen (G2) of the post-process specification mode.

For example, the specification screen display control part 302 switches between the pre-process specification mode and the post-process specification mode based on a switching operation. In the present embodiment, the case is described where selecting between the buttons (B11, B12) corresponds to the switching operation. However, the switching operation may be any operation. For example, the switching operation may be pressing a predetermined key on a keyboard, selecting a predetermined item in a menu on a screen, or selecting a predetermined icon.

The pre-process specification mode is a state in which specification of a pre-process is received. In the present embodiment, a state in which the specification screen (G2) of FIG. 4 is displayed corresponds to the pre-process specification mode. The post-process specification mode is a state in which specification of a post-process is received. In the present embodiment, a state in which the specification screen (G2) of FIG. 5 is displayed corresponds to the post-process specification mode.

Mode switching means mode changing. That is, changing from the pre-process specification mode to the post-process specification mode and changing from the post-process specification mode to the pre-process specification mode each correspond to mode switching. The specification screen display control part 302 may display both the specification screen (G2) of the pre-process specification mode and the specification screen (G2) of the post-process specification mode rather than switching between the modes. The specification screen display control part 302 may display a specification screen (G2) that receives specifications of both a pre-process and a post-process without distinguishing between the modes.

For example, in the specification screen (G2), as an execution conditions of each process, identification information and a processing result of a pre-process are specified. The identification information of a process may be any information that can identify the process, and is, for example, a process ID or a name of the process. In the present embodiment, the identification information of a process can be specified from the input forms (F20, F22), and the processing result can be specified from the input forms (F23B, F23F). The identification information and the processing result of a pre-process can be specified using any interface other than the input forms. For example, a check box, a radio button, a pull-down menu, or the like may be used. This point also applies to other information, and an interface that receives a specification by the user is not limited to the example of the present embodiment.

For example, in the specification screen (G2) of the pre-process specification mode, as an execution condition, identification information and a processing result of each of multiple pre-processes and a combination condition are specified. The combination condition is how to combine the multiple pre-processes, and is an AND condition or an OR condition. In the present embodiment, the combination condition is specified from the input form (F23C) and the buttons (B23D, B23E). For example, when the user specifies an execution condition for the process (p7) in the pre-process specification mode, by operating with respect to the input forms (F23A, F23) and the button (B23E), a process ID and a processing result of each of the processes (p3-p6), which are pre-processes, are specified as an OR condition. It is not necessary to connect all the multiple pre-processes with AND conditions or OR conditions, and AND conditions and OR conditions may be mixed.

For example, in the specification screen (G2) of the post-process specification mode, a processing result of each process and identification information of a post-process of the process are specified as an execution conditions of the post-process. In the present embodiment, a processing result of each process is specified from the input form (F23F), and identification information of a post-process is specified from the input form (F23G). For example, when the user specifies a post-process of the process (p3) in the post-process specification mode, a processing result of the process (p3) is specified in the input form (F23F), and the process (p7) as a post-process is specified in the input form (F23G).

For example, in the specification screen (G2) of the post-process specification mode, a processing result of each process, a processing result of another process, a combination condition of the process and the another process, and identification information of a post-process are specified as an execution condition. In the present embodiment, the processing result of the another process and the combination condition are specified from an input form (F23I) and the button (B23J). When the input form (F23I) or the button (B23J) is selected, an AND condition is specified. However, it is also possible that a specification of an OR condition is received. For example, when a process (p11) is executed after both processes (p9, p10) are completed, by operating with respect to the input forms (F23F, F23G), the input form (F23I), or the button (B23J), the user specifies completion of the process (p9) and completion of the process (p10) as AND conditions and specifies the process (p11) as a post-process.

For example, in the specification screen (G2) of the post-process specification mode, a processing result of each process and identification information of each of multiple post-processes of the process are specified as an execution condition of the each of the multiple post-processes. In the present embodiment, when the button (B23K) is selected, another post-process is added, and thus, multiple post-processes can be added. For example, when the user specifies the post-processes of the process (p2) in the post-process specification mode, after specifying the process (p3) as one of the post-processes by operating with respect to the input form (F23G), the user selects the button (B23K) to add the processes (p4-p6) as the other post-processes.

For example, in the specification screen (G2), parallel processing or branch processing can be specified as a processing type of each process. In the present embodiment, the user specifies a processing type by operating with respect to the button (B25). Further, for example, in the specification screen (G2), whether or not each process is a concentrated process can be specified. In the present embodiment, the user specifies presence or absence of a concentrated process by operating with respect to the button (B25). It is also possible that a processing type and a concentrated process are specified only in one the pre-process specification mode and the post-process specification mode.

Receiving Part

The receiving part 303 receives various operations from the user. For example, the receiving part 303 receives a switching operation between the pre-process specification mode in which a pre-process is specified using the specification screen (G2) and the post-process specification mode in which a post-process is specified using the specification screen (G2). In the present embodiment, the receiving part 303 receives the switching operation by receiving a selection between the buttons (B11, B12) of the control program creation screen (G1). As described above, the switching operation may be any other operation.

The receiving part 303 may receive various operations with respect to the specification screen (G2), not only the switching operation. For example, the receiving part 303 receives an operation for specifying the order of the processes. This operation may be any operation without being limited to an operation with respect to the screens of FIGS. 3-6. For example, this operation may be an operation of rearranging icons that respectively indicate the processes, or connecting the icons in an order, or may be an operation of inputting numerical numbers indicating the order of the processes.

Condition Increase Part

When a concentrated process is specified, the condition increase part 304 increases the number of combination conditions that can be specified for the concentrated process. As describe with reference to FIG. 5, the condition increase part 304 increases the number of OR conditions that can be specified from a first value (for example, 10) to a second value (for example, 50) for a process for which a concentrated process is specified from the button (B26). A register range used as a variable may change depending on the number of OR conditions that can be specified. It is also possible that the condition increase part 304 increases the number of AND conditions that can be specified instead of OR conditions that can be specified.

Control Program Creation Part

The control program creation part 305 creates a control program of the control device 10 that controls one or more industrial machines 20 such that the processes are executed in the order specified using the specification screen (G2). When an execution condition specified for a process is satisfied, the control program creation part 305 creates a control program such that an execution instruction for the process is transmitted to an industrial machine 20 that executes the process. A creation program for creating a control program from the execution conditions specified for the processes is included in the engineering tool in advance.

The control program creation part 305 uses the creation program to create a control program such that the order and the execution condition stored in the process information database (DB2) are defined in the control program. For example, when the ladder language is used, the control program creation part 305 creates a control program by arranging circuits such as coils for starting the processes in the order specified for the processes and setting the execution conditions specified for the processes as conditions for closing the circuits. A circuit for starting a process can also be said to be a circuit for calling an instruction program corresponding to the process. As an execution condition, any circuit that can express a conditional branching may be used.

Further, for example, when the robot language is used, the control program creation part 305 creates a control program by describing codes for starting the processes in the order specified for the processes and setting the execution conditions specified for the processes corresponding to the codes as conditional branchings executed by the codes. A code for starting a process can also be said to be a command for calling an instruction program corresponding to the process.

In the present embodiment, one or more industrial machines 20 store start variables for starting the processes to be executed by the one or more industrial machines 20. Each process is started when a corresponding start variable reaches a predetermined value. The control program creation part 305 creates a control program such that the start variables of the processes are changed to predetermined values in the order specified using the specification screen (G2). Since the control of the variables is performed by the instruction programs, the control program creation part 305 creates a control program such that the instruction programs for changing the start variables of the processes to the second value are called in a predetermined order.

For example, the control program creation part 305 creates a control program based on identification information and a processing result of a pre-process specified using the specification screen (G2) of the pre-process specification mode. The control program creation part 305 creates a control program such that an execution instruction of a process for which a pre-process is specified using the specification screen (G2) of the pre-process specification mode is transmitted when a processing result specified for the specified pre-process is obtained. In the control program, obtaining a specified processing result of a pre-process is defined as a processing conditional branching for transmitting an execution instruction of a process for which the pre-process is specified.

For the conditional branching itself, a conditional branching in the ladder language, the robot language, or the like may be used. In the creation program, a command for automatically describing a conditional branching circuit or code is defined. The control program creation part 305 outputs as a control program a file that describes a conditional branching circuit or code according to the creation program. This point also applies to a conditional branching described below.

For example, the control program creation part 305 creates a control program based on identification information, processing results, and combination conditions of pre-processes specified using the specification screen (G2) of the pre-process specification mode. The control program creation part 305 creates a control program such that an execution instruction of a process for which multiple pre-processes are specified using the specification screen (G2) of the pre-process specification mode is transmitted when a combination condition of the processing results specified for the specified pre-processes is satisfied. In the control program, that the combination condition in which the processing results of the pre-processes are specified is satisfied is defined as a processing conditional branching for transmitting an execution instruction of the process for which the multiple pre-processes are specified.

For example, the control program creation part 305 creates a control program based on a processing result and identification information of a post-process specified using the specification screen (G2) of the post-process specification mode. The control program creation part 305 creates a control program such that, when a specified processing result of a process for which a post-process is specified using the specification screen (G2) of the post-process specification mode is obtained, an execution instruction of the specified post-process is transmitted. In the control program, obtaining a specified processing result of a process for which a post-process is specified is defined as a processing conditional branching for transmitting an execution instruction of the post-process. Similar to the case where a pre-process is specified, the control program creation part 305 outputs as a control program a file that describes a conditional branching circuit or code according to the creation program.

For example, the control program creation part 305 creates a control program based on a processing result of each process, processing results of the other processes, a combination condition, and identification information of a post-process, which are specified using the specification screen (G2) of the post-process specification mode. The control program creation part 305 creates a control program such that an execution instruction of a post-process for which multiple processes are specified using the specification screen (G2) of the post-process specification mode is transmitted when a combination condition of the processing results specified for the specified processes is satisfied. In the control program, that the combination condition in which the processing results of the pre-processes are specified is satisfied is defined as a processing conditional branching for transmitting an execution instruction of the post-process for which the multiple processes are specified.

For example, the control program creation part 305 creates a control program based on processing results and identification information of post-processes specified using the specification screen (G2) of the post-process specification mode. The control program creation part 305 creates a control program such that, when a specified processing result of a process for which multiple post-processes are specified using the specification screen (G2) of the post-process specification mode is obtained, execution instructions of the specified post-processes are transmitted. In the control program, obtaining a specified processing result of a process for which multiple post-processes are specified is defined as a processing conditional branching for transmitting execution instructions of the post-processes.

For example, the control program creation part 305 creates a control program based on processing types of processes specified using the specification screen (G2). The control program creation part 305 creates a control program such that, when parallel processing is specified for a certain process, the number of executions of the process is not limited. The control program creation part 305 creates a control program such that, when branch processing is specified for a certain process, the number of executions of the process is limited to a predetermined number (for example, one).

Further, for example, the control program creation part 305 creates a control program based on increased combination conditions when a concentrated process is specified. The control program creation part 305 creates a control program based on combination conditions specified within a range having a predetermined upper limit for a process for which a concentrated process is not specified. The control program creation part 305 creates a control program based on combination conditions specified within a range for which an upper limit is lifted for a process for which a concentrated process is specified.

1-4. Processing Executed in First Embodiment

Figure 10:
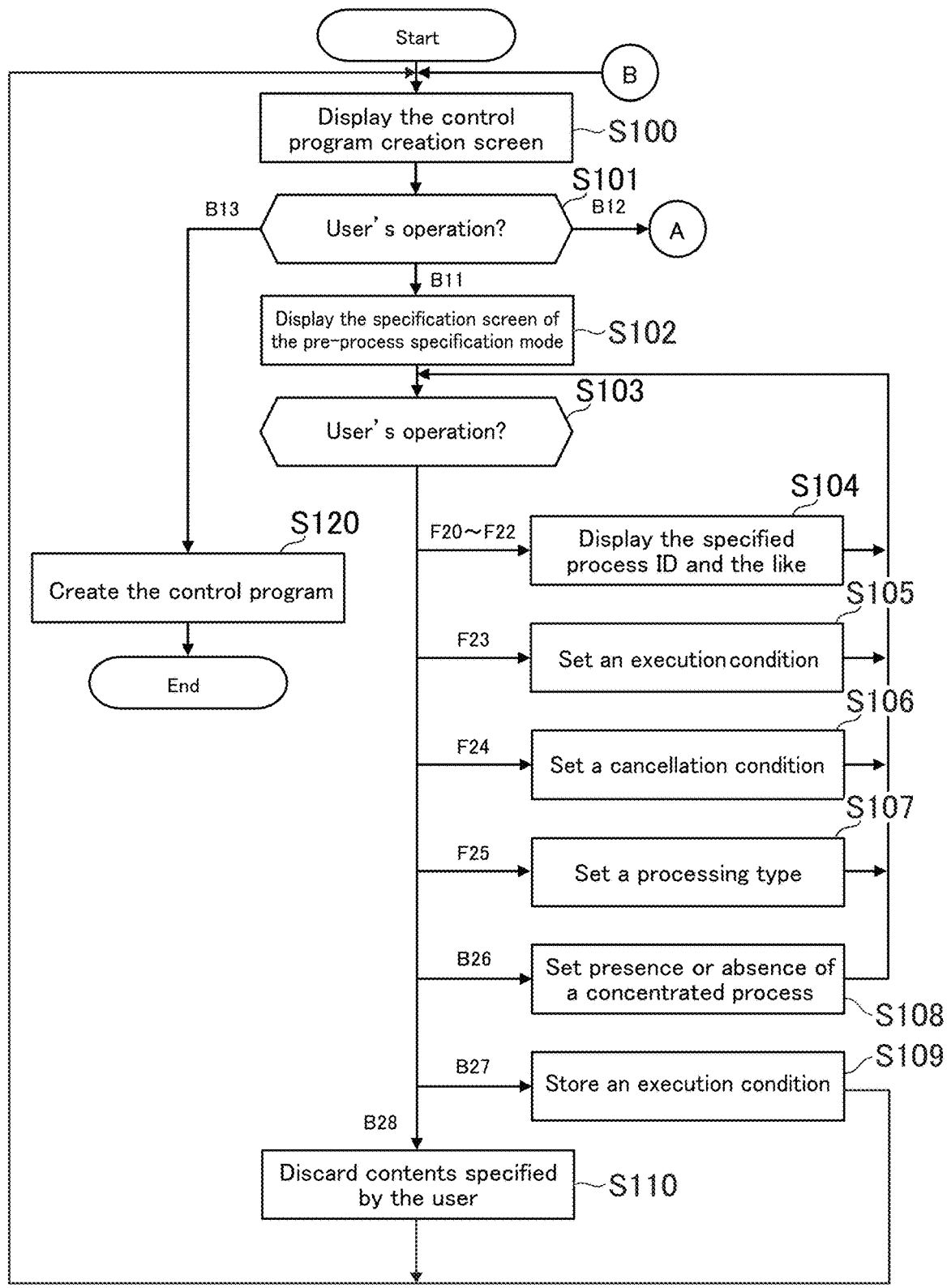
FIG. 10 illustrates an example of processing executed by a program creation device of the first embodiment.
Figure 11:
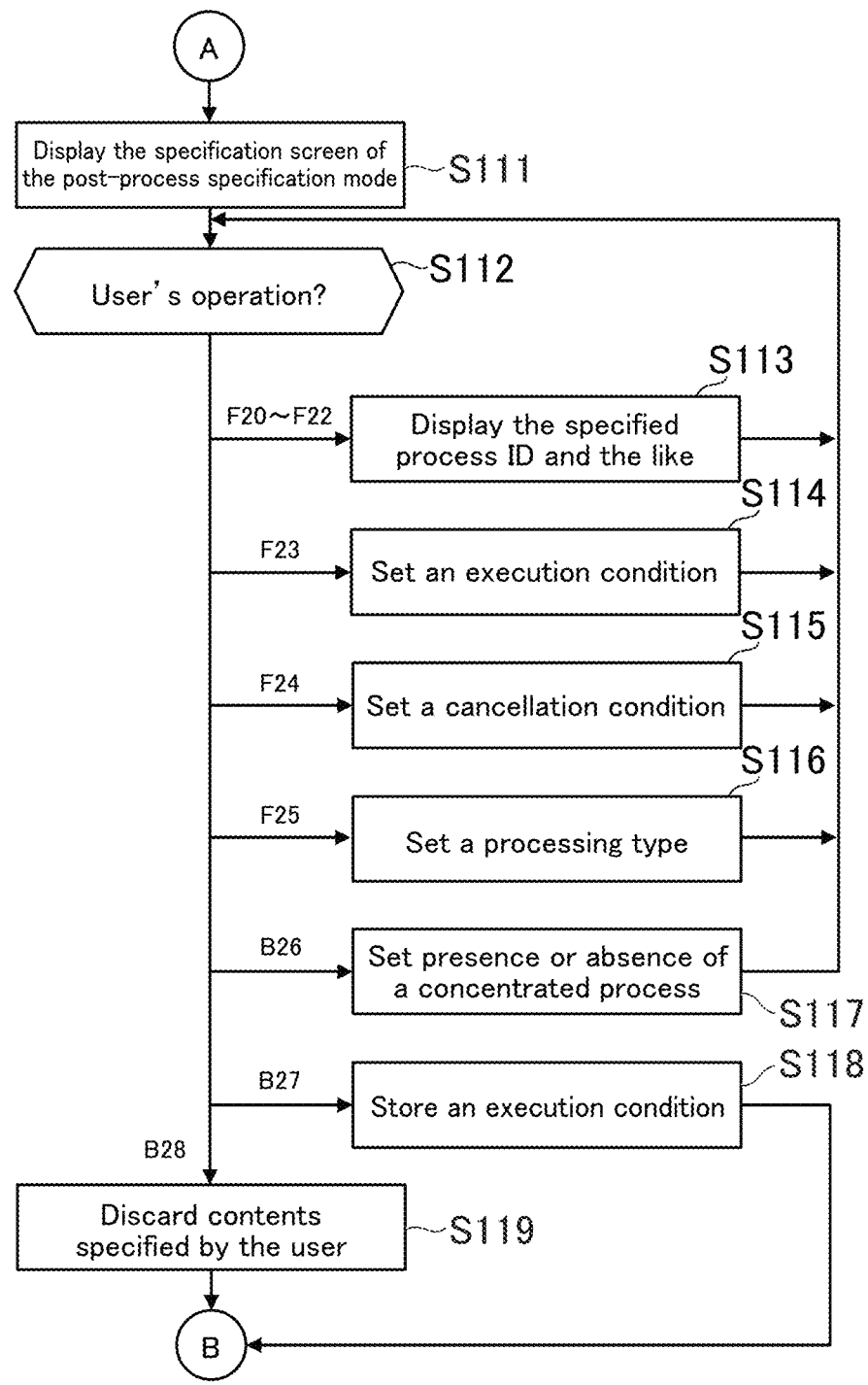
FIG. 11 illustrates an example of processing executed by the program creation device of the first embodiment.

FIGS. 10 and 11 illustrate an example of processing executed by the program creation device 30 of the first embodiment. The processing illustrated in FIGS. 10 and 11 is executed when the CPU 31 starts the engineering tool stored in the storage part 32. The processing illustrated in FIGS. 10 and 11 is an example of processing executed by the functional blocks illustrated in FIG. 7. It is assumed that the machine information database (DB1) and the process information database (DB2) have been created when the processing described below is executed.

As illustrated in FIG. 10, the program creation device 30 starts the engineering tool and displays the control program creation screen (G1) in the display part 35 (S100). The program creation device 30 identifies a user's operation based on a detection signal of the operation part 34 (S101). In S101, a selection of one of the buttons (B11-B13) is received.

When the user selects the button (B11) (S101; B11), the program creation device 30 displays the specification screen (G2) of the pre-process specification mode in the display part 35 based on the process information database (DB2) (S102). In S102, the program creation device 30 identifies the process IDs to be displayed in the pull-down menu of the input form (F23A) based on the process information stored in the process information database (DB2). In a case where the user has specified a process ID of a process in advance, the process information corresponding to the specified process may be displayed in the input forms (F20-F22).

The program creation device 30 identifies a user's operation based on a detection signal of the operation part 34 (S103). In S103, an operation with respect to the input forms (F20-F22), an operation with respect to the input form (F23), an operation with respect to the input form (F24), and an operation with respect to the buttons (B25-B28) are received.

When the operation with respect to the input forms (F20-F22) is received (S103; F20-F22), the program creation device 30 displays the specified process ID and the like in the input form (F20) and the like (S104). When the operation with respect to the input form (F23) is received (S103; F23), the program creation device 30 sets an execution condition of a process for which a pre-process is specified (S105). The method for the user to specify an execution conditions is as described above.

When the operation with respect to the input form (F24) is received (S103; F24), the program creation device 30 sets a cancellation condition of a process for which a pre-process is specified (S106). When the operation with respect to the button (B25) is received (S103; B25), the program creation device 30 sets a processing type of parallel processing or branch processing (S107). When the operation with respect to the button (B26) is received (S103; B26), the program creation device 30 sets presence or absence of a concentrated process (S108).

When the operation with respect to the button (B27) is received (S103; B27), the program creation device 30 stores an execution condition in the process information database (DB2) (S109), and returns to the processing of S100. When the operation with respect to the button (B28) is received (S103; B28), the program creation device 30 discards contents specified by the user (S110), and returns to the processing of S100.

In S101, when the user selects the button (B12) (S101; B12), moving to FIG. 11, the program creation device 30 displays the specification screen (G2) of the post-process specification mode in the display part 35 (S111). The program creation device 30 identifies a user's operation based on a detection signal of the operation part 34 (S112). In S112, an operation with respect to the input forms (F20-F22), an operation with respect to the input form (F23), an operation with respect to the input form (F24), and an operation with respect to the buttons (B25-B28) are received. Processings of S113-S119 executed when the operations are received are respectively the same as the processings of S104-S110. However, the processing of S114 is different in details from the processing of S105. The difference between the setting of an execution condition in the post-process specification mode in S114 and the setting of an execution condition in the pre-process specification mode in S105 is as described above.

In S101, when the user selects the button (B13) (S101; B13), the program creation device 30 creates a control program (S120) such that the processes are executed in the order specified using the specification screen (G2), and the present processing ends.

According to the program creation device 30 of the first embodiment, when the user specifies at least one of a pre-process and a post-process for each of the processes using the specification screen (G2), a control program of the control device 10 is created such that the processes are executed in the order specified using the specification screen (G2). Therefore, for example, the user does not need to perform programing using ladder diagrams or the like, and the creation of the control program can be simplified. For example, when the user specifies a pre-process (B) as an execution condition of a certain process (A) using the specification screen (G2), a control program is created such that the process (A) is executed after the pre-process (B). Therefore, the creation of the control program can be simplified. Further, for example, when the user specifies a post-process (D) to be executed after a certain process (C) using the specification screen (G2), a control program is created such that the post-process (D) is executed after the process (C) (such that the process (C) is specified as an execution condition of the post-process (D), that is, the process (C) is a pre-process of the post-process (D)). Therefore, the creation of the control program can be simplified.

Further, the program creation device 30 creates a control program based on identification information and a processing result of a pre-process specified using the specification screen (G2). As a result, the user only specifies information about these using the specification screen (G2). Therefore, the creation of the control program can be simplified. For example, when an execution condition of a certain process is an AND condition of processing results of multiple pre-processes, it is often easier to imagine an execution condition by specifying a pre-process than by specifying a post-process, and it is particularly effective in such a case.

Further, the program creation device 30 creates a control program based on identification information, a processing result, and a combination condition of each of multiple pre-processes specified using the specification screen (G2). As a result, even when an execution condition of a certain process is a condition of processing results of multiple pre-processes, the creation of the control program can be simplified.

Further, the program creation device 30 creates a control program based on a processing result of each process and identification information of a post-process of the process specified using the specification screen (G2). As a result, since the user only specifies information about these using the specification screen (G2), the creation of the control program can be simplified. For example, when a specific process is concentratedly executed after multiple processes are executed, it is often easier to imagine an execution condition by specifying a post-process than by specifying a pre-process, and it is particularly effective in such a case.

Further, the program creation device 30 creates a control program based on a processing result of each process, processing results of the other processes, a combination condition, and identification information of a post-process, which are specified using the specification screen (G2). As a result, since the user only specifies information about these using the specification screen (G2), the creation of the control program can be simplified.

Further, the program creation device 30 creates a control program based on a processing result of each process and identification information of multiple post-processes of the process specified using the specification screen (G2). As a result, since the user only specifies information about these using the specification screen (G2), the creation of the control program can be simplified.

Further, since the program creation device 30 can switch between the pre-process specification mode and the post-process specification mode by a switching operation, a user-friendly interface can be provided.

In addition, the program creation device 30 creates a program based on a processing type of each process specified using the specification screen (G2). As a result, a program capable of handling various processing types can be created, and a user-friendly interface can be provided.

Further, the program creation device 30 can specify more combination conditions for a concentrated process by increasing the number of combination conditions that can be specified for a concentrated process. Further, register consumption increases when it is allowed to specify a large number of combination conditions for all the processes. However, register consumption can be suppressed by securing registers only for necessary processes.

Further, the program creation device 30 can simplify creation of a program when each process has an execution condition different from that of the control device 10.

Further, the program creation device 30 can simplify creation of a program when each process starts when a corresponding start variable reaches a predetermined value.

2. Second Embodiment

Next, a second embodiment is described. In the first embodiment, the method for simplifying the creation of the control program has been described. In the second embodiment, a method for simplifying creation of an instruction program is described. The control program may be created as in the first embodiment. However, in the second embodiment, a method for creating the control program does not matter. For example, the user may create a control program using the ladder language, the robot language, or the like instead of using a method of the second embodiment. In the second embodiment described below, description of structural elements same as those of the first embodiment is omitted.

2-1. Overview of Second Embodiment

A program creation device 30 of the second embodiment creates an instruction program for a control device 10, which is an industrial machine, to instruct another industrial machine 20 to perform a predetermined operation. Since the control device 10 is a type of industrial machine, the industrial machines 20 in FIG. 1 can be said to be other industrial machines when viewed from the control device 10. In the following description, although it is not described as another industrial machine 20, a part simply described as an industrial machine 20 can be read as another industrial machine 20.

The processes described in the first embodiment are each an example of the predetermined operation. The predetermined operation is not limited to a process, but may be any operation that can be executed by an industrial machine 20. The operation is not limited to a physical operation such as a movement of the robot 24, but may be a software process executed internally by an industrial machine 20. For example, the predetermined operation may be preparation of a process, output of an execution result of a process, or an analysis of an execution result of a process. The predetermined operation may be referred to as a job or a task.

In the second embodiment, a profile, which is an interface connecting the control device 10 and an industrial machine 20, is prepared. The profile may have the same meaning as a communication protocol, and a communication procedure or a data format is defined. Based on the profile, the control device 10 transmits an instruction for performing a predetermined operation to an industrial machine 20. Based on the profile, the industrial machine 20 understands the received instruction and executes the predetermined operation. A response from the industrial machine 20 to the control device 10 is also executed according to the profile. The profile is included in the engineering tool.

A common profile may be prepared regardless of the types of industrial machines 20, or profiles that respectively correspond to the types of industrial machines 20 may be prepared. In the second embodiment, a case is described where a profile is prepared only for a robot controller. However, a profile may also be prepared for other types of industrial machines 20. Therefore, in the second embodiment, the control device 10 controls the industrial machine (20A) according to the profile. The profile is not used when the control device 10 controls the industrial machine (20B).

Similar to the first embodiment, some register ranges of registers of the control device 10 are allocated for controlling the industrial machines 20. The register range allocated for controlling the industrial machine (20A) is defined in the profile. That is, the profile includes structure data that defines where and what to store in the registers. In the present embodiment, a part of the structure data included in the profile for instructing a predetermined operation is mainly described.

FIG. 12 illustrates a part of the structure data included in the profile. As illustrated in FIG. 12, a register system in the profile is defined in the structure data. In addition, for example, the structure data shows a relationship between offsets of register numbers included in a register range and information stored in the register numbers. An offset is a register number relative to a leading register number. That is, an offset is a register number counted from a leading register number or is a relative register number with respect to a leading register number.

For example, the register range for controlling the industrial machine (20A) is from a leading register number specified for the industrial machine (20A) to an address obtained by adding a last register number of the offsets defined in the structure data. For example, offsets 0-4259 are defined in the structure data. When a leading register number specified for the industrial machine (20A) is 5000, an address range allocated for controlling the industrial machine (20A) is 5000-9259.

In the example of FIG. 12, a command request ID is stored in offsets 1115-1116. The command request ID is an example of request information. In the present embodiment, a part that describes a command request ID can be read as request information. The request information is information for requesting an industrial machine 20 to execute an instruction. An instruction transmitted to an industrial machine 20 is executed when the request information is updated. That is, even when a certain instruction is transmitted to an industrial machine 20, execution of the instruction is waited until the request information is updated. In the present embodiment, a case is described where a command request ID is a numerical value and is updated by an increment. However, the request information may be in any format other than an ID.

A main command is stored in an offset 1117. The main command is information indicating a function requested of an industrial machine 20 among multiple functions possessed by the industrial machine 20. In the present embodiment, three functions are prepared: a robot control function for controlling the robot 24; a monitoring function for monitoring an operation of the robot 24; and a collection function for collecting data related to the operation of the robot 24, and the main command is a value that indicates one of these functions. An industrial machine 20 may have only a single function. In this case, the main command can be omitted.

A subcommand is stored in an offset 1118. The subcommand is information indicating an operation requested of an industrial machine 20 among multiple operations that the industrial machine 20 can execute. In the present embodiment, multiple operations are prepared for each function indicated by a main command. The subcommand indicates one of the multiple operations prepared for the function indicated by the main command. That is, in the present embodiment, a specific operation executed by an industrial machine 20 is specified by a combination of a main command and a subcommand.

Offsets 1119-1600 are reserved as a command data area. The command data area stores details of an operation requested of the industrial machine 20. For example, in a case of a job selection command, a job name and a start portion of the job are stored in the command data area. In addition, data such as a parameter required in executing a job may be stored in the command data area. Further, for example, in a case of a power supply control command, data indicating whether to turn power supply on or off is stored in the command data area. The same applies to other commands, and when necessary, data indicating a detailed content of a command may be stored in the command data.

FIG. 13 illustrates an example of data stored in the main command, the subcommand, and the command data area. The relationship illustrated in FIG. 13 is also defined as a profile. In the example of FIG. 13, a main command of "1" means the robot control function. A main command of "2" means the monitoring function. A main command of "3" means the collection function. A subcommand indicating processing details of each function is defined for each of the three main command values. A subcommand indicates a specific processing content of a function indicated by a corresponding main command.

For example, in the case of the main command of the robot control function, subcommands for alarm reset, power control, process program selection, mode switching, process program execution, and robot operation toward a target position are prepared. The subcommands of the robot control function are not limited to those in the example of FIG. 13. For example, subcommands for a hold stop, an HMI lock, a cycle change, robot operations specifying pulses of axes, and the like, or subcommands corresponding to commands such as MOVE and WAIT in the robot language, may be prepared. Similarly, for the main commands of the monitoring function and the collection function, subcommands corresponding to these functions are prepared.

As illustrated in FIG. 13, data stored in a command data area differs depending on a combination of a main command and a subcommand. Data that defines which register number is to be referenced in the command data area (what data is stored in which register number) is stored in each of the control device 10 and the industrial machine (20A).

For example, since "job selection" indicated by a combination of a main command "1" and a subcommand "3" identifies a job to be selected, a job name is stored in a register of a predetermined register number in the command data area. In a case where a process is executed, a process program corresponds to a job. In a case where execution is started from the middle of a job, a start portion of the job is stored in a register of a predetermined register number in the command data area. There are also cases where the command data area is not used such as the case of "job execution" indicated by a combination of a main command "1" and a subcommand "5."

FIG. 14 illustrates an example of changes of variables when a job is selected and executed. FIG. 14 illustrates changes in command request ID, main command, subcommand, and command data area in the register range of the control device 10 allocated for controlling the industrial machine (20A). In the example of FIG. 14, as an initial state before the control program is executed, the command request ID is "0" and no data is stored in other areas.

When the control program starts, in order for the industrial machine 20 to select a job, a value (for example, 1) indicating the robot control function is written as the main command, and a value (for example, 3) indicating process program selection as a subcommand are written. In the registers reserved as the command data area, a name of the job (in FIG. 14, "Job AAA"; and, when a process program corresponds to the job, a name of the process program) and a start portion of the job (line 3 in FIG. 14) are written. When the above writing is completed, the command request ID is incremented in order to cause the industrial machine 20 to select a process program.

The control device 10 transmits data corresponding to the above register range to the industrial machine 20. Upon receiving the transmission data, the industrial machine 20 determines whether or not the command request ID has been incremented. Here, since the command request ID has been incremented from "0" to "1," the main command and the subcommand are executed to read the job indicated by the program name. When a start portion is specified, the industrial machine 20 reads the job after the start portion. At this point, the read job has not yet been executed.

The control device 10 receives from the industrial machine 20 a response indicating an execution result of the main command and the subcommand. The control device 10 receives the response and confirms validity of the execution result. When the legitimacy is confirmed, in order to instruct the industrial machine 20 to execute the job, a value (for example, 1) indicating the robot control function is written as a main command, and a value (for example, 5) indicating job execution is written as a subcommand. Nothing is written to the registers allocated as the command data area, and the command request ID is incremented.

The control device 10 transmits data corresponding to the above register range to the industrial machine 20. Upon receiving the transmission data, the industrial machine 20 determines whether or not the command request ID has been incremented. Here, since the command request ID has been incremented from "1" to "2," the main command and the subcommand are executed, and the read process program is executed.

As described above, in the second embodiment, the control device 10 causes the industrial machine 20 to execute a predetermined operation by using the command request ID, the main command, the subcommand, and the command data area. Since the instruction from the control device 10 to the industrial machine 20 is performed according to the profile, a format is determined to some extent. Therefore, a circuit such as a ladder diagram when an instruction program is created is also determined in format to some extent. In other words, there is a high possibility that a flow of transmitting an instruction using a main command and a subcommand describes the same circuit or code and the like regardless of which user creates an instruction program.

Therefore, in the present embodiment, an instruction program template is prepared in advance, and a user can use the template when creating an instruction program. For example, when a user launches the engineering tool installed in the program creation device 30, an instruction program creation screen, which is a user interface for creating an instruction program, is displayed in the display part 35.

FIG. 15 illustrates an example of the instruction program creation screen. As illustrated in FIG. 15, the instruction program creation screen (G3) displays a list (L30) of processes to be executed by the industrial machine (20A) to which an instruction is to be transmitted by an instruction program. In the example of FIG. 15, of the processes (p1-p7) of FIG. 2, the processes (p1-p3, p6-p7) are executed by the industrial machine (20A). In the second embodiment, instruction programs for instructing the processes can be created using a template. In the following, a case where an instruction program for instructing the process (p2) is created is described as an example.

For example, it is assumed that process program selection and process program execution are necessary in order to execute the process (p2). In this case, the user operates the registers according to the flow described with reference to FIG. 14. The user can create an instruction program for performing such a register operation using a template. For example, the user creates an instruction program of the process (p2) using a template that defines a selection procedure of a process program, which is an example of a job, and a template that defines an execution procedure of the process program.

Figure 16:
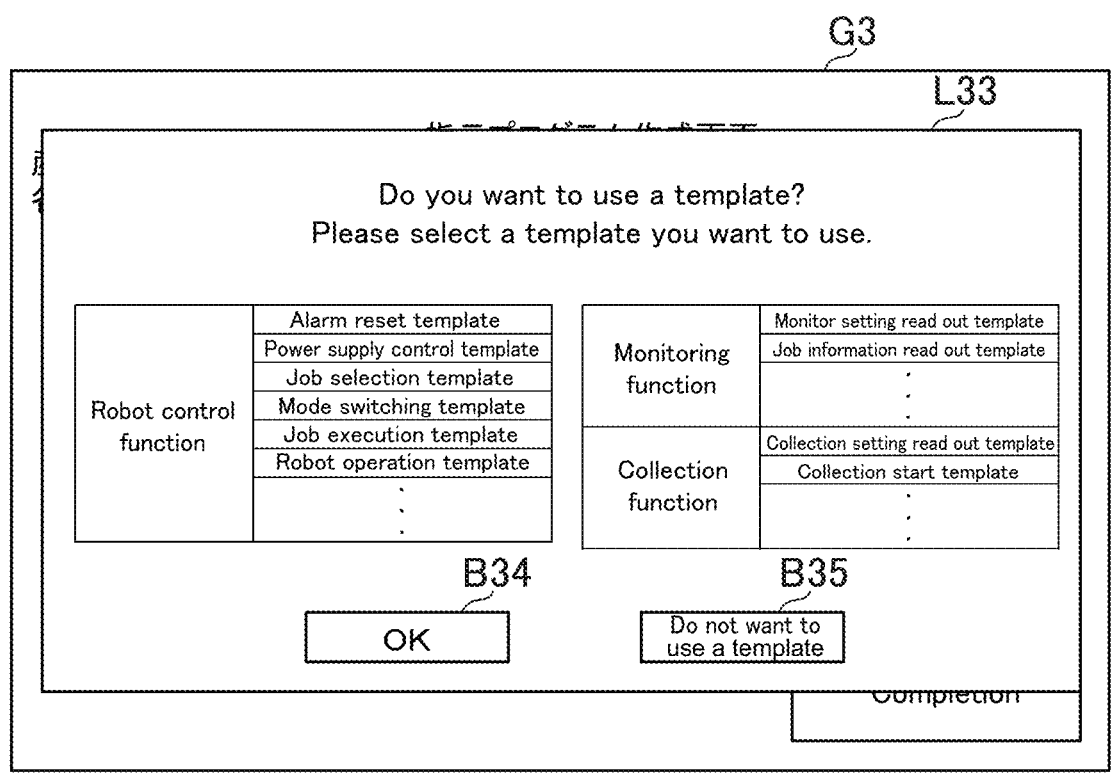
FIG. 16 illustrates how a template is selected from the instruction program creation screen.

FIG. 16 illustrates how a template is selected from the instruction program creation screen (G3). When the user selects the process (p2) from the list (L30) of the instruction program creation screen (G3) and presses a button (B31), a template list (L33) is displayed as illustrated in FIG. 16. In the list (L33), templates are respectively displayed in a selectable manner for the operations that can be executed by the industrial machine 20.

In the present embodiment, each operation is mainly instructed by a main command and a subcommand. Therefore, as illustrated in FIG. 16, in the list (L33), one template is displayed for each combination of a main command and a subcommand. To execute the process (p2), a process program is selected first. Therefore, the user selects a job selection template from the list (L33) and selects a button (B34). When the user selects a button (B35), an instruction program can be created without using a template.

Figure 17:
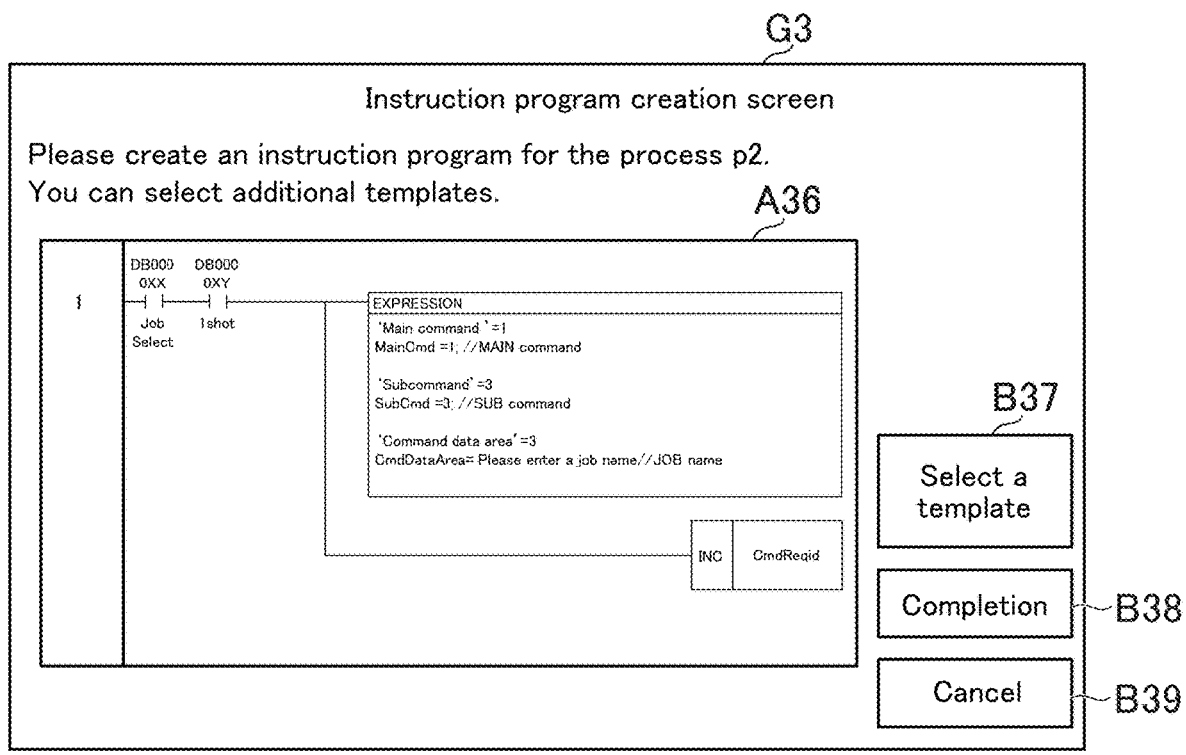
FIG. 17 illustrates an example of the instruction program creation screen when a template has been selected.

FIG. 17 illustrates an example of the instruction program creation screen (G3) when a template has been selected. As illustrated in FIG. 17, in the instruction program creation screen (G3), a ladder diagram for creating the instruction program of the process (p2) is displayed in an editing area (A36). In the example of FIG. 17, the job selection template selected by the user is expanded in the editing area (A36). The template includes a command for setting the main command (variable "MainCmd" in FIG. 17) to "1," a command for setting the subcommand (variable "SubCmd" in FIG. 17) to "3," a command for specifying a name of a certain process program in the command data area (variable "CmdDataArea" in FIG. 17), and a command for incrementing the command request ID (variable "CmdReqid" in FIG. 17).

The user can edit a circuit of a ladder diagram illustrated by the template. For example, since the template does not include a name of a process program, the user describes a name of a process program (for example, "p2"). In this way, by using the template, the user can create a ladder diagram for selecting a process program simply by describing the name of the process program. When the user selects a button (B37), the list (L33) is displayed again. The user selects a job execution template from the list (L33).

Figure 18:
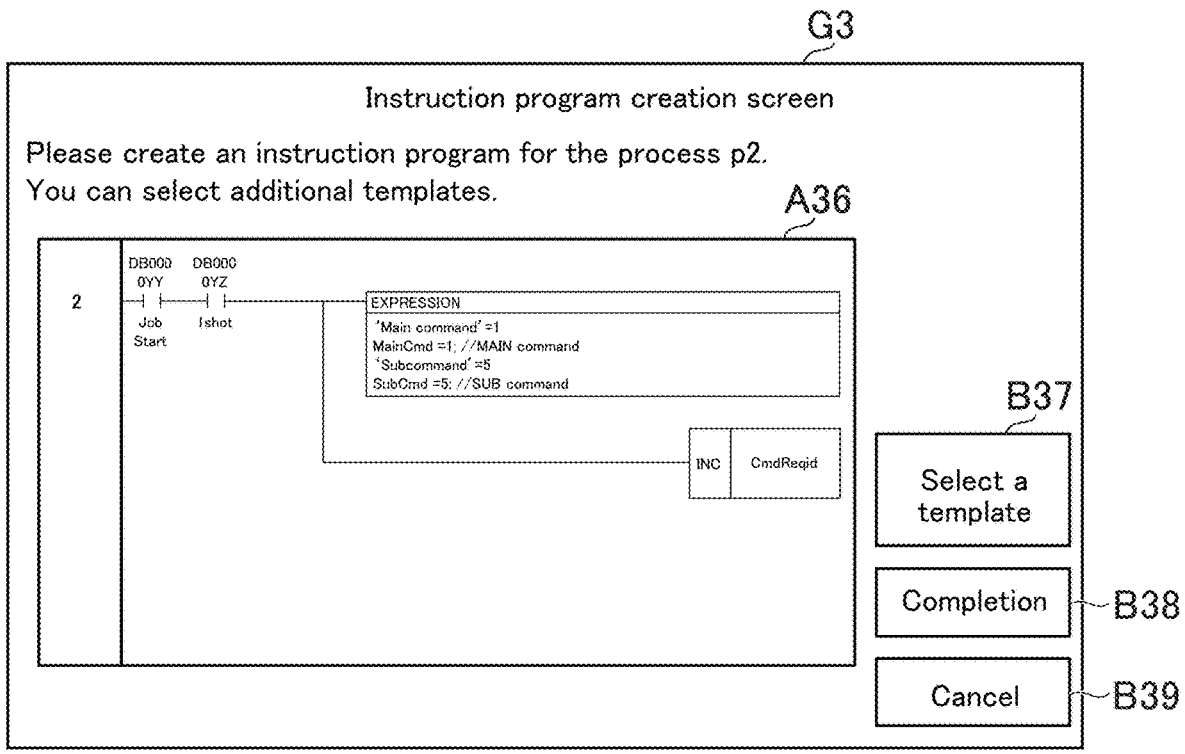
FIG. 18 illustrates an example of the instruction program creation screen when a template has been further selected.

FIG. 18 illustrates an example of the instruction program creation screen (G3) when a template has been further selected. As illustrated in FIG. 18, the job execution template selected by the user is expanded in the editing area (A36). The template contains a command for setting the main command to "1," a command for setting the subcommand to "5," and a command for incrementing the command request ID. As described above, since nothing needs to be stored in the command data area, the user can complete the creation of the ladder diagram of the process (p2) simply by expanding the template. In this way, even when multiple templates are required, the user can create ladder diagrams by expanding the templates one after another.

As described above, the program creation device 30 of the present embodiment displays in the instruction program creation screen (G3) a template corresponding to an operation selected by the user. Since the user can create an instruction program using a template, the creation of the instruction program is simplified. In the following, details of the control system 1 of the present embodiment are described.

2-2. Functions Realized by Second Embodiment

Figure 19:
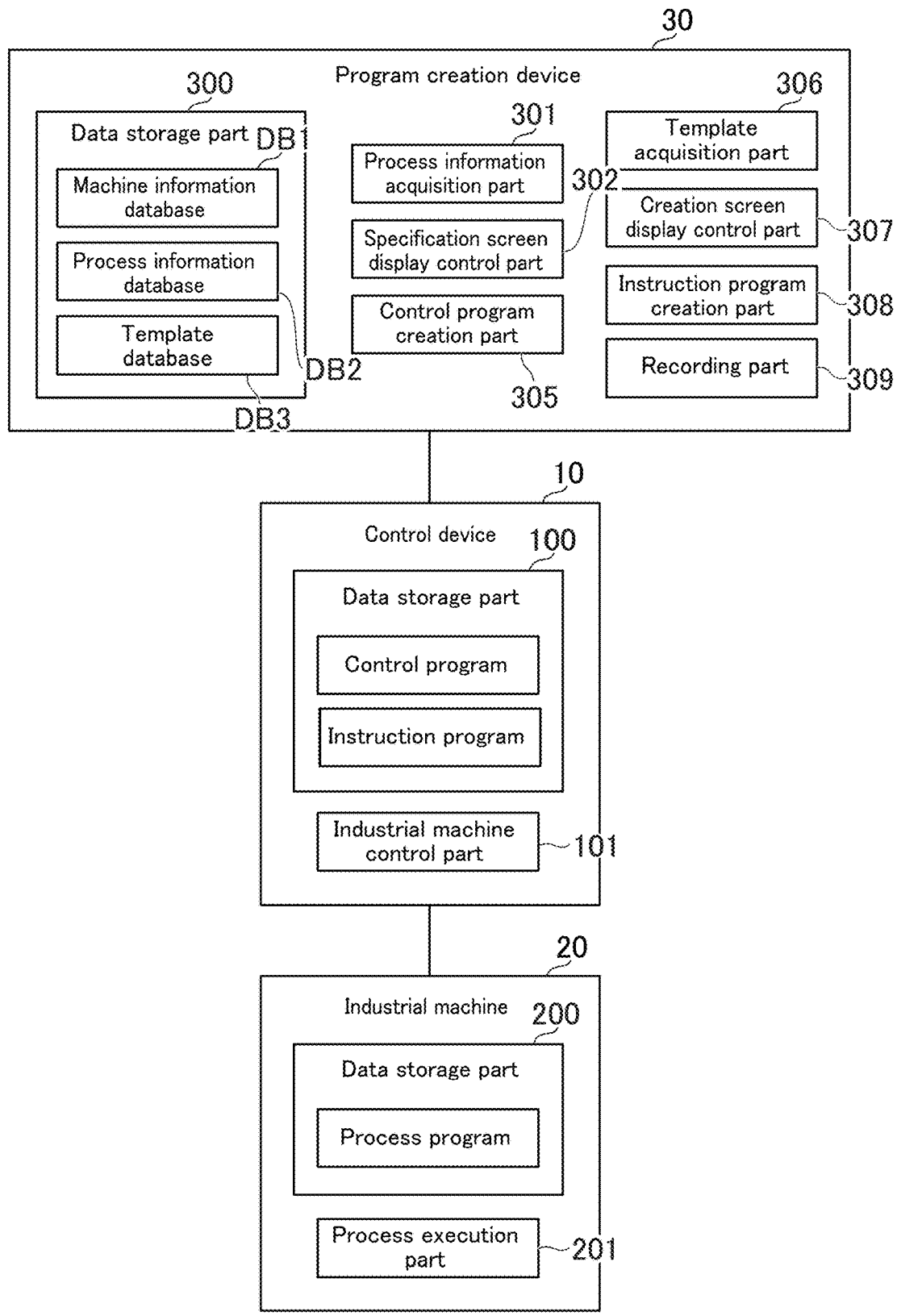
FIG. 19 is a functional block diagram of a second embodiment.

FIG. 19 is a functional block diagram of the second embodiment. As illustrated in FIG. 19, in the program creation device 30 of the second embodiment, a data storage part 300, a process information acquisition part 301, a specification screen display control part 302, a control program creation part 305, a template acquisition part 306, a creation screen display control part 307, and an instruction program creation part 308 are realized. The template acquisition part 306, the creation screen display control part 307, and the instruction program creation part 308 are mainly realized by the CPU 31.

The program creation device 30 may include the receiving part 303 and the condition increase part 304 described in the first embodiment. The functions of the control device 10 and the industrial machines 20 may be the same as in the first embodiment. However, in the second embodiment, The processing described with reference to FIGS. 12-14 in which the command request ID, the main command, the subcommand, and the command data area are used, is executed between the industrial machine control part 101 and the process execution part 201.

Data Storage Part

The data storage part 300 of the second embodiment stores data required for creating an instruction program. For example, the data storage part 300 stores a template database (DB3). Other data stored by the data storage part may be the same as that in the first embodiment. The data storage part of the second embodiment does not have to store the data described in the first embodiment.

FIG. 20 illustrates an example of the template database (DB3). As illustrated in FIG. 20, the template database (DB3) is a database that stores the templates that respectively correspond to the multiple operations that the industrial machines 20 can execute. For example, the template database (DB3) stores main commands, subcommands, and templates. The templates may be created in any language such as the ladder language or the robot language. A data format of the templates may be any format conforming to these languages.

The templates may be created by the user as in a modified embodiment to be described later. However, in the second embodiment, the templates are prepared in advance. For example, the templates are prepared by a company that provides an engineering tool. A template for a certain operation includes: a command for storing a main command corresponding to the operation in a register for storing a main command; and a command for storing a subcommand corresponding to the operation in a register for storing a subcommand.

A template for a certain operation that stores certain information in the command data area includes a command for storing the necessary information in a predetermined register number in the command data area. The information to be stored in the command data area is specified by the user. Where in the template to specify the information is included as a comment of the template. In the present embodiment, since the command request ID is updated in order to execute the instruction from the control device 10, the templates each include a command for updating the command request ID.

It is not always necessary to prepare a template for each combination of a main command and a subcommand. For example, when a main command and a subcommand are not used, a template may be prepared for each of operations (processes) such as carrying in, measurement, and machining. In this case, a basic procedure for instructing these operations is described in a template. When a name of a job for instructing an operation is determined in advance, a template may include the name of the job. A template may include a character string indicating a command for instructing an operation.

Template Acquisition Part

The template acquisition part 306 acquires templates that respectively correspond to multiple operations. In the present embodiment, since the templates are stored in the template database (DB3), the template acquisition part 306 acquires the templates stored in the template database (DB3). For example, the template acquisition part 306 acquires a template corresponding to an operation selected in the instruction program creation screen (G3). A template may be included in a database other than the template database (DB3). Further, a template may be stored in a computer other than the program creation device 30.

In the present embodiment, since some register ranges of the registers of the control device 10 are allocated for controlling the industrial machines 20, the control device 10 stores an instruction to an industrial machine 20 in a predetermined register included in a register range, and transmits the stored instruction to the industrial machine 20. Each template includes information for storing in a predetermined register, as an instruction, operation information that allows a corresponding operation to be identified. This information may be in any form, for example, a circuit such as a coil in the ladder language, or a command in the robot language. In addition, for example, this information may include a numerical value indicating a register address, or may include a text indicating a supplementary description.

In a predetermined register, a main command requesting one of multiple functions of an industrial machine 20 and a subcommand requesting an operation of the function are stored as instructions, and each template includes information for storing the main command and the subcommand as operation information in the predetermined register. This information includes a register address corresponding to a main command, a specific value of the main command, a register address corresponding to a subcommand, and a specific value of the subcommand. In addition, for example, this information may include a text indicating a supplementary description.

In an area corresponding to a combination of a main command and a subcommand in a predetermined register, detailed information about details of an operation corresponding to the subcommand is stored, and a template of an operation that requires the detailed information includes information for storing the detailed information about the details of the operation in the area. This detailed information includes a register address corresponding to a command data area and specific information to be stored in the command data area. In addition, for example, this detailed information may include a text indicating a supplementary description.

A command request ID requesting execution of an instruction is stored in a predetermined register. The industrial machine 20 executes the instruction when the request information is updated. Each template includes information for updating the command request ID stored in the predetermined register. This information includes an instruction for incrementing the command request ID. In addition, for example, this information may include a text indicating a supplementary description.

An industrial machine 20 stores an instruction received from the control device 10 in a predetermined register of its own, references the instruction stored in the predetermined register, and executes an operation corresponding to the instruction. Therefore, it can be said that each template includes information for storing an instruction to an industrial machine 20 in a predetermined register of the industrial machine 20. That is, since a main command and a subcommand are stored in a predetermined register of an industrial machine 20, a template includes information for storing an instruction to that effect.

Multiple operations include a job selection operation that selects a job to be executed by an industrial machine 20 and a job start operation that starts a job selected by the job selection operation, and templates of the multiple operations include a template corresponding to the job selection operation and a template corresponding to the job start operation. A process program is an example of a job. A job may be a unit of a certain operation, and may be other than a process program.

The control device 10 can control multiple industrial machines 20 of different types, and the template acquisition part 306 acquires a template according to a selected type among multiple types that can be controlled by the control device 10. In the present embodiment, since a template is prepared for a robot controller, the template acquisition part 306 acquires the template when the industrial machine 20 for which an instruction program is created is the robot controller. When templates are prepared for other types of industrial machines 20 such as a processing device, the template acquisition part 306 may acquire a template according to the type of the industrial machine 20 for which an instruction program is created.

Creation Screen Display Control Part

The creation screen display control part 307 displays a template corresponding to a selected operation among multiple operations in the instruction program creation screen (G3). The creation screen display control part 307 displays a template corresponding to an operation selected by the user in the editing area (A36) of the instruction program creation screen (G3). The editing area (A36) is an area performing editing, coding or the like of a ladder diagram, and is a portion that corresponds to an instruction program editor. The user can perform any editing with respect to the template expanded in the editing area (A36). Editing is addition, deletion, or modification of a description of a circuit, a code, or the like.

Instruction Program Creation Part

The instruction program creation part 308 creates an instruction program for instructing a selected operation based on an operation with respect to a template displayed in the instruction program creation screen (G3). The instruction program creation part 308 creates an instruction program from a template as it is when the template is not edited, and, when the template is edited, creates an instruction program based on the edited content of the template. AS a method for creating an instruction program from a ladder diagram or a code, a commonly known method may be used. In a case of a language that requires conversion such as compilation, an instruction program may be created by conversion such as compilation.

In the present embodiment, the industrial machine (20A) is a robot controller. The robot controller can respectively execute multiple operations based on multiple robot programs that are created in a first language and are stored in the robot controller. Each template is described in a second language, and the instruction program creation part 308 creates an instruction program in the second language. In the present embodiment, the first language is the robot language and the second language is the ladder language. The first language and the second language may each be any language and are not limited to the examples of the present embodiment.

Recording Part

Each operation is a process executed by an industrial machine 20, and a recording part 309 records an instruction program and process information about a corresponding process in association with each other in the data storage part 300. As described in the first embodiment, process information such as information about an instruction program corresponding to a certain process is stored in the process information database (DB2). Therefore, the recording part 309 stores in the process information database (DB2) information about an instruction program created by the instruction program creation part 308 and process information such as a process ID about a corresponding process in association with each other.

Specification Screen Display Control Part and Control Program Creation Part

Based on the process information, the specification screen display control part 302 displays the specification screen (G2) for specifying at least one of a pre-process and a post-process for each process. The control program creation part 305 creates the control program of the control device 10 such that the instruction programs that respectively correspond to the processes are called in the order specified using the specification screen. The functions of the specification screen display control part 302 and the control program creation part 305 may be respectively the same as those in the first embodiment. In order to display the specification screen (G2), the process information acquisition part 301 may be included in the program creation device 30.

2-3. Processing Executed by Second Embodiment

Figure 21:
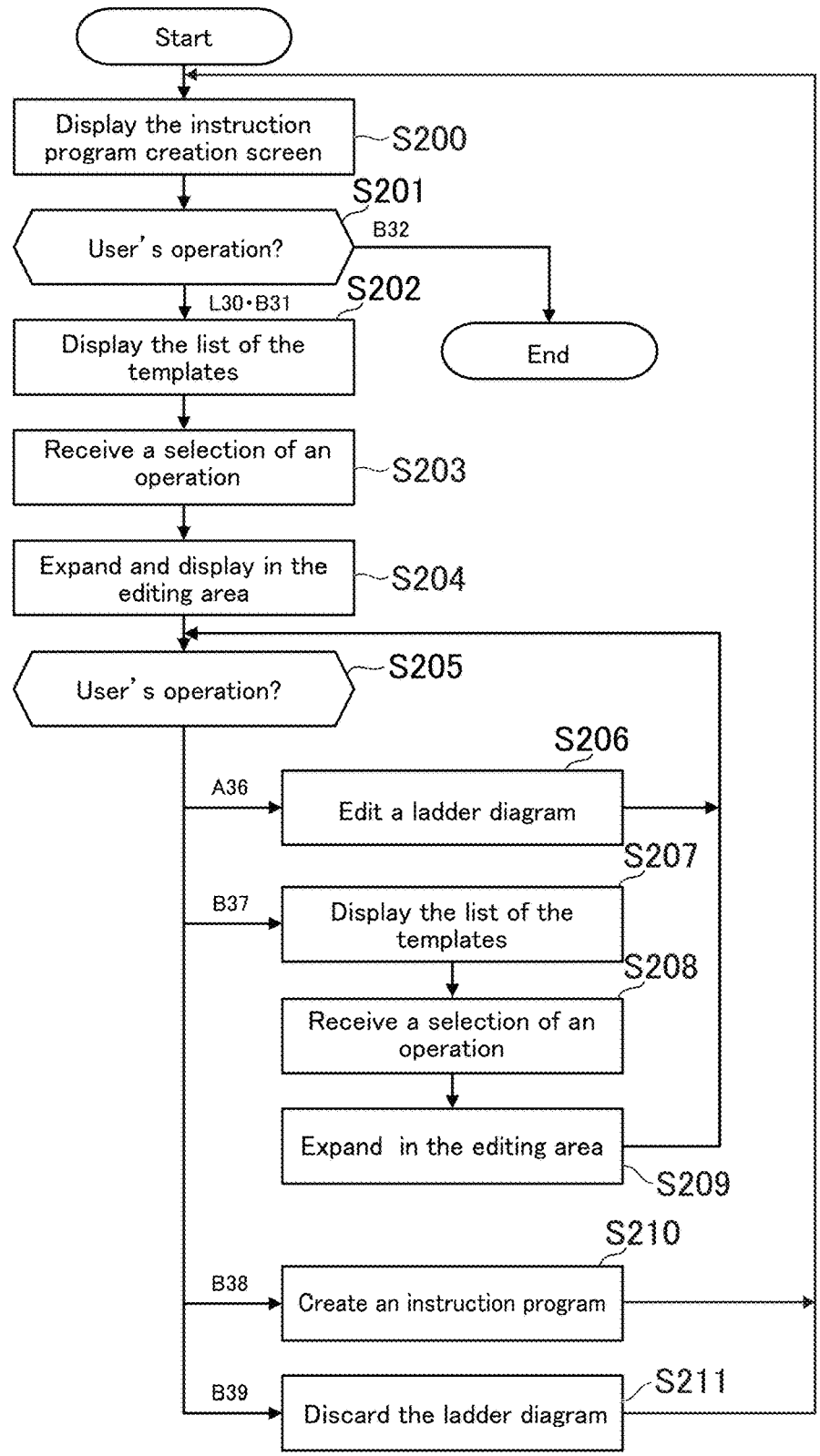
FIG. 21 illustrates an example of processing executed by a program creation device of the second embodiment.

FIG. 21 illustrates an example of processing executed by the program creation device 30 of the second embodiment. The processing illustrated in FIG. 21 is executed when the CPU 31 starts the engineering tool stored in the storage part 32. The processing illustrated in FIG. 21 is an example of processing executed by the functional blocks illustrated in FIG. 19. It is assumed that the machine information database (DB1) and the process information database (DB2) have been created when the processing described below is executed.

As illustrated in FIG. 21, the program creation device 30 starts the engineering tool and displays the instruction program creation screen (G3) in the display part 35 (S200). The program creation device 30 identifies a user's operation based on a detection signal of the operation part 34 (S201). In S201, an operation of selecting a process of the list (L30) and selecting the button (B31), or an operation of selecting the button (B32) is received.

When the user selects a process of the list (L30) and selects the button (B31) (S201; L30 and B31), the program creation device 30 displays the list (L33) of the templates that respectively correspond to the multiple operations (S202) and receives a selection of an operation for which a template is to be expanded (S203). The program creation device 30 displays the editing area (A36) for creating an instruction program of the selected process (S204).

The program creation device 30 identifies a user's operation based on a detection signal of the operation part 34 (S205). In S205, an operation with respect to the editing area (A36) or an operation selecting one of buttons (B37-B39) is received. When the user has operated with respect to the editing area (A36) (S205; A36), the program creation device 30 edits a ladder diagram based on the user's operation (S206).

When the user selects the button (B37) (S205; B37), the program creation device 30 displays the list (L33) of the templates that respectively correspond to the multiple operations (S207), and receives a selection of an operation for which a template is to be expanded (S208). The program creation device 30 expands the template of the operation selected by the user in the editing area (A36) (S209), and returns to the processing of S205.

When the button (B38) is selected (S205; B38), the program creation device 30 creates an instruction program corresponding to the ladder diagram displayed in the editing area (A36) (S210). When the button (B39) is selected (S205; B39), the program creation device 30 discards the ladder diagram displayed in the editing area (A36) (S211) and returns to the processing of S200. When the button (B32) is selected in S201 (S201; B32), the processing ends.

According to the program creation device 30 of the second embodiment, among the templates that respectively correspond to the multiple operations, a template corresponding to a selected operation is displayed in the instruction program creation screen (G3), and an instruction program for instructing the selected operation is created based on an operation with respect to the displayed template. As a result, the user does not need to perform programming from scratch using a language such as a ladder, and the creation of an instruction program can be simplified. For example, when performing programming of the control device 10 that controls the robot controller, a language on the robot controller side and a language on the control device 10 side may be different from each other. The user is often familiar with the language of the robot controller and is often unfamiliar with the language of the control device 10 side. In such a case, by preparing a template for each operation that can be executed by the robot controller, even a user who is unfamiliar with the language on the control device 10 side can easily create an instruction program. It can effectively support the creation of the instruction programs for a user who is unfamiliar with the language on the control device 10 side.

Further, depending on an industrial machine 20, the program creation device 30 may have a profile defined as an interface with the control device 10. The profile defines to some extent a procedure required for causing an industrial machine 20 to perform a desired operation. For example, when the profile defines a procedure such as storing an instruction in a predetermined register and transmitting the instruction, each template includes information as an instruction for storing, in a predetermined register, operation information that allows a corresponding operation to be identified. As a result, the creation of an instruction program can be further simplified.

Further, the program creation device 30 includes information for storing a main command and a subcommand in a predetermined register as operation information in a template. As a result, the creation of an instruction program can be further simplified.

Further, depending on a subcommand, the program creation device 30 sets detailed information about details of an operation in a predetermined area. Even in such a case, a template includes information for storing the detailed information in a predetermined area.

Further, the program creation device 30 includes information for updating the request information in a template when an update of the request information is a condition in order to execute an instruction from an industrial machine. As a result, the creation of an instruction program can be further simplified.

Further, depending on an industrial machine, the program creation device 30 may have a profile defined as an interface with the control device 10. The profile defines to some extent a procedure required for causing an industrial machine 20 to perform a desired operation. For example, in a case where an instruction is stored in a predetermined register of an industrial machine 20 and the industrial machine 20 references the register to execute an operation, each template includes information for storing information about a corresponding operation in a predetermined register. As a result, the creation of an instruction program can be further simplified.

Further, in a case where an industrial machine executes a job selection operation and a job start operation separately, the program creation device 30 respectively prepares templates for both operations. As a result, the creation of an instruction program can be further simplified.

Further, in a case where an industrial machine can control multiple types of devices, the program creation device 30 acquires and displays a template according to a selected type. As a result, a template according to the type of the device that the user is trying to set can be provided.

Further, the program creation device 30 allows a user to easily create a program using a template even when the user is unfamiliar with the second language.

Further, the program creation device 30 has control program creation part 305, and the like. As a result, similar to the first embodiment, the creation of the control program can be simplified.

3. Modified Embodiments

The present invention is not limited to the embodiments described above. Appropriate modifications are possible within a scope without departing from the spirit of the present invention.

3-1. Modified Embodiment of First Embodiment

Figure 22:
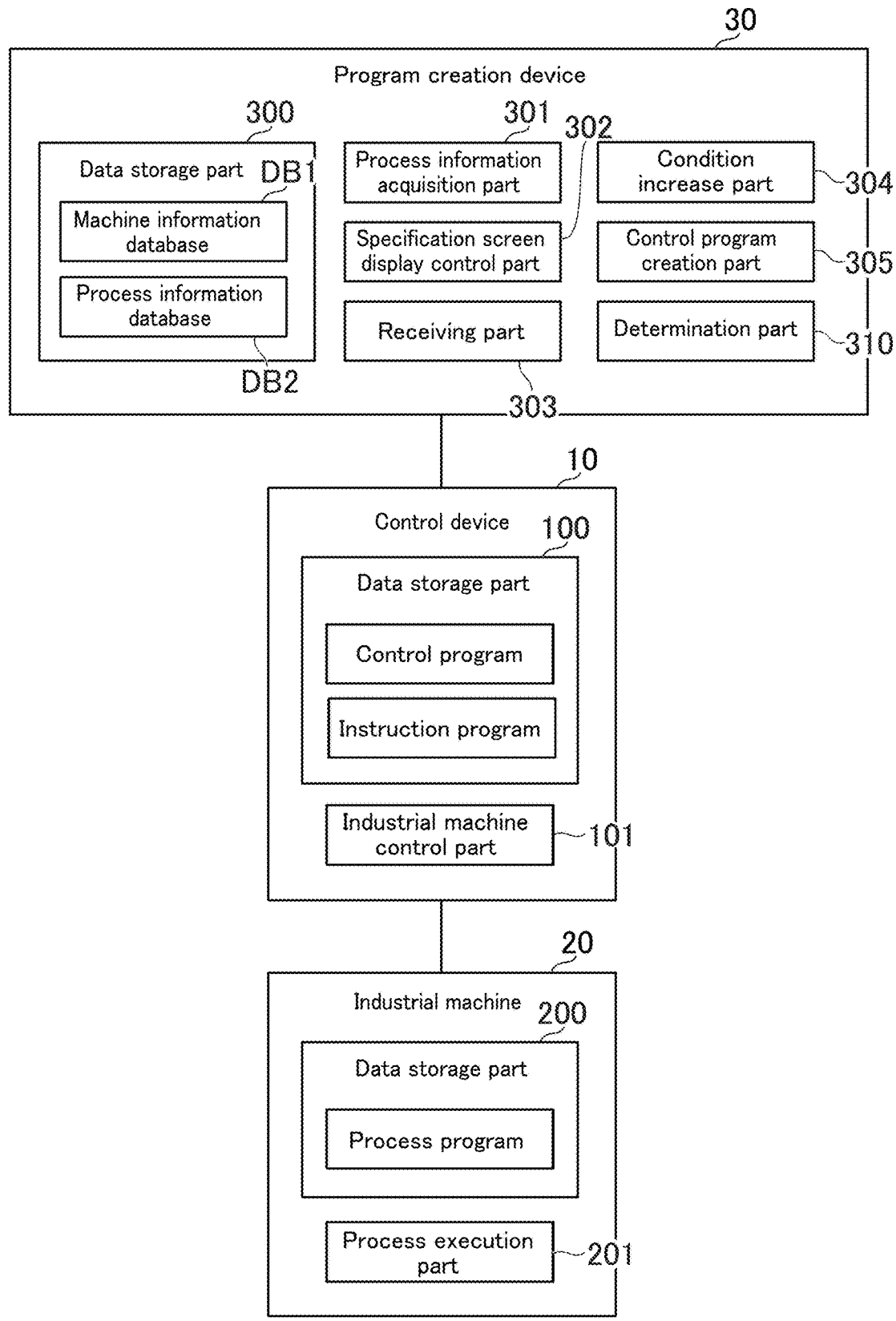
FIG. 22 is a functional block diagram of a modified embodiment according to the first embodiment.

FIG. 22 is a functional block diagram of a modified embodiment according to the first embodiment. As illustrated in FIG. 22, a determination part is realized. The determination part 310 is mainly realized by the CPU 31. Based on an execution condition of each process, the determination part 310 determines whether to set the pre-process specification mode in which a pre-process is specified using the specification screen (G2) or the post-process specification mode in which a post-process is specified using the specification screen (G2). That is, based on an execution condition of each process, the determination part 310 selects either the pre-process specification mode or the post-process specification mode.

A relationship between an execution condition and the pre-process specification mode or the post-process specification mode is defined in advance in the data storage part 300. The determination part 310 sets a mode associated with an execution condition of a certain process among the two modes. For example, in a case of a process for which multiple pre-processes are specified as an execution condition, since it is easier to edit in the post-process specification mode, the determination part 310 determines that the post-process specification mode be set for the process with this execution condition. Further, for example, in a case of a process for which one pre-process is specified as an execution condition, since it is easier to edit in the pre-process specification mode, the determination part 310 determines that the pre-process specification mode be set for the process with this execution condition. The specification screen display control part 302 displays the specification screen (G2) based on the set mode.

According to the above modified embodiment, based on an execution condition of each process, whether to set the pre-process specification mode or the post-process specification mode is determined. As a result, a user-friendly interface can be provided. For example, when a current execution condition of a certain process is easier to imagine in the pre-process specification mode, the pre-process specification mode is set, and when a current execution condition of a certain process is easier to imagine in the post-process specification mode, the post-process specification mode is set. In this way, it is possible to use a proper mode according to each process.

3-2. Modified Embodiment of Second Embodiment (2-1) A template may be in a text format, and may be changed to a ladder format when displayed in the instruction program creation screen (G3). The text format is an example of a first format. The ladder format is an example of a second format. That is, data in the first format is a text file with an extension ".txt." Data in the second format is a ladder file with an extension ".cxp." The first format and the second format may be data formats that can be converted to each other, and are not limited to the example of the present embodiment. For example, it is also possible that the first format is a csv format and the second format is a robot language format.

The creation screen display control part 307 displays an acquired template in the instruction program creation screen (G3) by performing conversion such that data in the text format is displayed as data in the ladder format. Since a template is created as data in the text format, the instruction program creation part 308 may create an instruction program using a commonly known application that converts data in the text format to data in the ladder format. Similarly, when formats other than the text format and the ladder format are used, the first format and the second format may be converted using a commonly known application.

According to the modified embodiment (2-1), the program creation device 30 can create an instruction program using an application that converts data in the text format to data in the ladder format.

Figure 23:
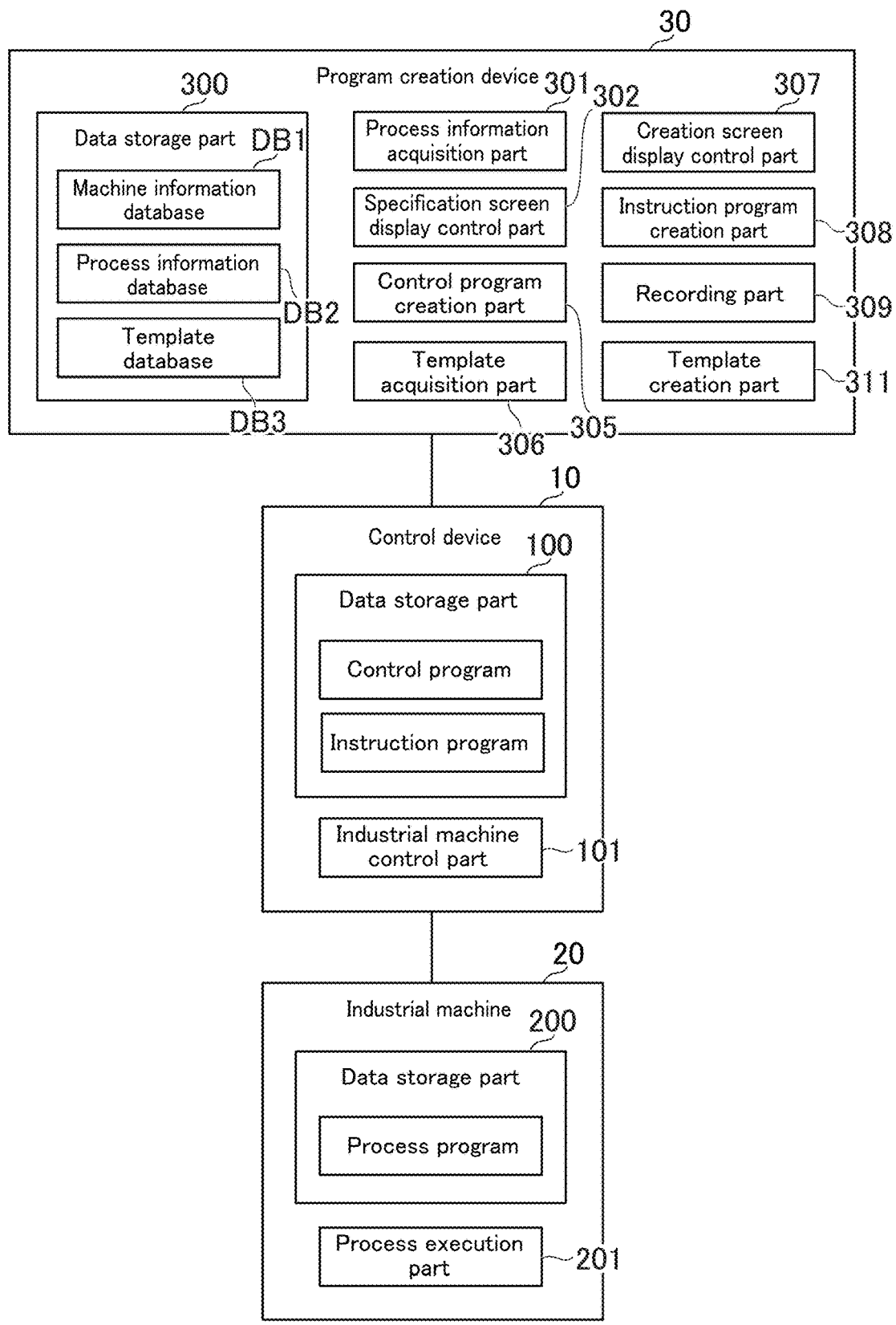
FIG. 23 is a functional block diagram of a modified embodiment according to the second embodiment.

(2-2) FIG. 23 is a functional block diagram of a modified embodiment according to the second embodiment. As illustrated in FIG. 23, a template creation part 311 is realized. The template creation part is mainly realized by the CPU 31. The template creation part 311 creates templates that respectively correspond to the operations. The user specifies an operation for which a template is to be created, and creates the template using an editor of the ladder language or the robot language or the like. The template creation part 311 acquires a ladder diagram or a code based on a user's operation, and stores the ladder diagram or the code as a template in the template database. The template acquisition part 306 acquires the template created by the template creation part.

According to the modified embodiment (2-2), an optimum template can be provided according to the user by allowing the user to create the template.

3-3. Other Modified Embodiments

Further, for example, the first embodiment and the second embodiment may be combined, or the above modified embodiments may be combined.

Further, for example, the functions described above may each be realized by any device in the control system 1. For example, the robot controller corresponds to the control device, and the functions described as being included in the control device 10 may be realized by the robot controller. Further, for example, the functions described as being included in the control device 10 may be shared by multiple devices.

Further, the above-described embodiments are illustrated as specific examples. The invention disclosed in the present specification is not limited to the structures or data storage examples of these specific examples. A person skilled in the art may modify these disclosed embodiments in various ways, such as changing shapes or numbers of physical structures, data structures, and an execution order of processes. It should be understood that the technical scope disclosed in the present specification also includes such modifications.

A program creation device according to one aspect of the present invention includes: a process information acquisition part that acquires process information about multiple processes executed by one or more industrial machines; a specification screen display control part that, based on the process information of the processes, displays a specification screen in which at least one of a pre-process and a post-process of each of the processes is specified; and a control program creation part that creates a control program of a control device that controls the one or more industrial machines such that the processes are executed in an order specified using the specification screen.

According to an embodiment of the present invention, for example, creation of a control program that controls one or more industrial machines can be simplified.

Obviously, numerous modifications and variations of the present invention are possible in light of the above teachings. It is therefore to be understood that within the scope of the appended claims, the invention may be practiced otherwise than as specifically described herein.

What is claimed is:

1. A creation device, comprising:
processing circuitry configured to acquire process information about a plurality of processes executed by at least one industrial machine, control display of a specification screen based on the process information of the processes such that at least one of a pre-process and a post-process of each of the processes is specified for an execution condition of at least one of the processes, and create a control program of a control device that controls the at least one industrial machine such that the processes are executed in an order specified using the specification screen,
wherein the control program is created such that at least one of the pre-process and the post-process of at least one of the processes is set as the execution condition for the at least one of the processes in the control program.

2. The creation device according to claim 1, wherein in the specification screen, identification information and a processing result of the pre-process are specified for the execution condition of the at least one of the processes, and the processing circuitry is further configured to create the control program based on the identification information and the processing result specified using the specification screen.

3. The creation device according to claim 1, wherein in the specification screen, identification information and processing results of pre-processes of processes in the processes, and a combination condition are specified for a plurality of execution conditions, and the processing circuitry is further configured to create the control program based on the identification information and the processing results of the pre-processes and the combination condition specified using the specification screen.

4. The creation device according to claim 1, wherein in the specification screen, a processing result of a process in the processes and identification information of a post-process of the process in the processes are specified as an execution condition of the post-process, and the processing circuitry is further configured to create the control program based on the processing result and the identification information specified using the specification screen.

5. The creation device according to claim 4, wherein in the specification screen, a processing result of a process in the process, a second processing result of a second process after the process, a combination condition of the process and the second process, and the identification information are specified for the execution condition, and the processing circuitry is further configured to create the control program based on the processing result of the process, the processing result of the second process, the combination condition, and the identification information specified using the specification screen.

6. The creation device according to claim 1, wherein in the specification screen, processing results of processes in the processes and identification information of a plurality of post-processes of the processes are specified for execution conditions of the post-processes, and the processing circuitry is further configured to create the control program based on the processing results and the identification information of the post-processes specified using the specification screen.

7. The creation device according to claim 1, wherein the processing circuitry is further configured to receive a switching operation between a pre-process specification mode in which the pre-process is specified using the specification screen and a post-process specification mode in which the post-process is specified using the specification screen, and switch between the pre-process specification mode and the post-process specification mode based on the switching operation.

8. The creation device according to claim 1, wherein in the specification screen, parallel processing or branch processing is specifiable as a processing type of each process, and the processing circuitry is further configured to create the control program based on a processing type of each process specified using the specification screen.

9. The creation device according to claim 1, wherein in the specification screen, whether or not each process is a concentrated process is specifiable, and when the concentrated process is specified, the processing circuitry is further configured to increase a number of combination conditions that are specifiable for the concentrated process, and create the control program based on the increased combination conditions when the concentrated process is specified.

10. The creation device according to claim 1, wherein the processing circuitry configured to determine, based on an execution condition of each process, whether to set a pre-process specification mode in which the pre-process is specified using the specification screen or a post-process specification mode in which the post-process is specified using the specification screen, and control display of the specification screen based on the set mode.

11. The creation device according to claim 1, wherein based on the control program, the control device transmits execution instructions of the processes from the control device to the at least one industrial machine, and the at least one industrial machine executes processes based on execution conditions different from the received execution instructions from the control device.

12. The creation device according to claim 1, wherein the at least one industrial machine stores start variables for starting processes, each process is started when a corresponding start variable reaches a predetermined value, and the processing circuitry is further configured to create the control program such that the start variables of the processes are changed to predetermined values in an order specified using the specification screen.

13. A creation method, comprising:
acquiring, using processing circuitry, process information about a plurality of processes executed by at least one industrial machine;
controlling, using the processing circuitry, display of a specification screen based on the process information of the processes such that at least one of a pre-process and a post-process of each of the processes is specified for an execution condition of at least one of the processes; and
creating, using the processing circuitry, a control program of a control device that controls the at least one industrial machine such that the processes are executed in an order specified using the specification screen, wherein the control program is created such that at least one of the pre-process and the post-process of at least one of the processes is set as the execution condition for the at least one of the processes in the control program.

14. A non-transitory computer readable medium having stored thereon a control program created by a creation method comprising:
acquiring process information about a plurality of processes executed by at least one industrial machine;
controlling display of a specification screen based on the process information of the processes such that at least one of a pre-process and a post-process of each of the processes is specified for an execution condition of at least one of the processes; and
creating control program of a control device that controls the at least one industrial machine such that the processes are executed in an order specified using the specification screen,
wherein the control program is created such that at least one of the pre-process and the post-process of at least one of the processes is set as the execution condition for the at least one of the processes in the control program.

15. The creation device according to claim 2, wherein in the specification screen, a processing result of a process in the processes and identification information of a post-process of the process are specified for the execution condition of the post-process, and the processing circuitry is further configured to create the control program based on the processing result and the identification information specified using the specification screen.

16. The creation device according to claim 3, wherein in the specification screen, a processing result of a process in the processes and identification information of a post-process of the process are specified for the execution condition of the post-process, and the processing circuitry is further configured to create the control program based on the processing result and the identification information specified using the specification screen.

17. The creation device according to claim 2, wherein in the specification screen, processing results of processes in the processes and identification information of a plurality of post-processes of the processes are specified for execution conditions of the post-processes, and the processing circuitry is further configured to create the control program based on the processing results and the identification information of the post-processes specified using the specification screen.

18. The creation device according to claim 2, wherein the processing circuitry is further configured to receive a switching operation between a pre-process specification mode in which the pre-process is specified using the specification screen and a post-process specification mode in which the post-process is specified using the specification screen, and switch between the pre-process specification mode and the post-process specification mode based on the switching operation.

19. The creation device according to claim 3, wherein the processing circuitry is further configured to receive a switching operation between a pre-process specification mode in which the pre-process is specified using the specification screen and a post-process specification mode in which the post-process is specified using the specification screen, and switch between the pre-process specification mode and the post-process specification mode based on the switching operation.

20. The creation device according to claim 4, wherein the processing circuitry is further configured to receive a switching operation between a pre-process specification mode in which the pre-process is specified using the specification screen and a post-process specification mode in which the post-process is specified using the specification screen, and switch between the pre-process specification mode and the post-process specification mode based on the switching operation.

* * * * *